United States Patent
Nabetani et al.

(10) Patent No.: US 11,626,906 B2
(45) Date of Patent: Apr. 11, 2023

(54) WIRELESS COMMUNICATION DEVICE

(71) Applicant: International Semiconductor Group, Seoul (KR)

(72) Inventors: Toshihisa Nabetani, Kanagawa (JP); Ryoko Matsuo, Tokyo (JP); Tomoko Adachi, Kanagawa (JP); Tsuguhide Aoki, Kanagawa (JP)

(73) Assignee: International Semiconductor Group, Seoul (KR)

( * ) Notice: Subject to any disclaimer, the term of this patent is extended or adjusted under 35 U.S.C. 154(b) by 0 days.

(21) Appl. No.: 17/506,915

(22) Filed: Oct. 21, 2021

(65) Prior Publication Data

US 2022/0038143 A1 Feb. 3, 2022

Related U.S. Application Data

(63) Continuation of application No. 16/893,586, filed on Jun. 5, 2020, now Pat. No. 11,190,239, which is a
(Continued)

(30) Foreign Application Priority Data

Sep. 7, 2015 (JP) .................................. 2015-176061
Sep. 5, 2016 (JP) .................................. 2016-172407

(51) Int. Cl.
  *H04B 7/0413* (2017.01)
  *H04B 7/0452* (2017.01)
  (Continued)

(52) U.S. Cl.
  CPC ............. *H04B 7/0413* (2013.01); *H04B 7/04* (2013.01); *H04B 7/0452* (2013.01); *H04L 5/0023* (2013.01); *H04L 5/0055* (2013.01)

(58) Field of Classification Search
  None
  See application file for complete search history.

(56) References Cited

U.S. PATENT DOCUMENTS 7,809,394 B1  10/2010 Li
9,769,839 B2   9/2017 Ito
(Continued)

FOREIGN PATENT DOCUMENTS

JP    2010-028284 A   2/2010
JP       6495984 B2   4/2019
(Continued)

OTHER PUBLICATIONS

Chu et al., "Broadcast and Unicast (Trigger) in LD MU", Jul. 2015, 802.11-15/0831r2, pp. 1-16.
(Continued)

*Primary Examiner* — Phirin Sam
(74) *Attorney, Agent, or Firm* — Foley & Lardner LLP

(57) ABSTRACT

According to one embodiment, a wireless communication device includes a receiver configured to receive a plurality of first frames which are transmitted by multiplexing; and a transmitter configured to transmit a second frame containing check results indicating whether the plurality of first frames are successfully received and first information specifying at least one wireless communication device. The receiver is configured to receive a plurality of third frames transmitted by multiplexing in response to the second frame.

12 Claims, 21 Drawing Sheets

Related U.S. Application Data continuation of application No. 16/368,127, filed on Mar. 28, 2019, now Pat. No. 10,715,218, which is a continuation of application No. 15/257,464, filed on Sep. 6, 2016, now Pat. No. 10,291,299.

(51) Int. Cl.
*H04L 5/00* (2006.01)
*H04B 7/04* (2017.01)

(56) References Cited

U.S. PATENT DOCUMENTS

| | | | |
|---|---|---|---|
| 10,257,321 | B2 | 4/2019 | Nabetani |
| 10,291,299 | B2 | 5/2019 | Nabetani |
| 10,631,298 | B2 | 4/2020 | Yang |
| 2007/0153760 | A1 | 7/2007 | Shapira |
| 2008/0113640 | A1 | 5/2008 | Bennett |
| 2008/0267133 | A1 | 10/2008 | Shida |
| 2014/0050194 | A1 | 2/2014 | Gaal |
| 2015/0110046 | A1 | 4/2015 | Merlin |
| 2016/0014595 | A1 | 1/2016 | Wong |
| 2016/0087775 | A1 | 3/2016 | Hedayat |
| 2016/0100408 | A1* | 4/2016 | Hedayat ............ H04L 5/0037 370/329 |
| 2016/0197663 | A1 | 7/2016 | Stadelmeier |
| 2016/0262184 | A1 | 9/2016 | Wentink |
| 2016/0316458 | A1 | 10/2016 | Kwon |
| 2016/0330732 | A1 | 11/2016 | Moon |
| 2016/0365952 | A1 | 12/2016 | Kim |
| 2016/0373559 | A1 | 12/2016 | Nabetani et al. |
| 2017/0019863 | A1 | 1/2017 | Cariou |
| 2017/0048048 | A1 | 2/2017 | Seok |
| 2017/0339691 | A1 | 11/2017 | ElArabawy |
| 2018/0007561 | A1 | 1/2018 | Adachi et al. |
| 2018/0007701 | A1 | 1/2018 | Adachi et al. |
| 2018/0076860 | A1 | 3/2018 | Chu |
| 2018/0124826 | A1 | 5/2018 | Seok |
| 2018/0176918 | A1 | 6/2018 | Hedayat |
| 2018/0199362 | A1 | 7/2018 | Rong |
| 2018/0255536 | A1 | 9/2018 | Suzuki |
| 2018/0351709 | A1 | 12/2018 | Hedayat |
| 2018/0351726 | A1 | 12/2018 | Golitschek Edler von Elbwart |
| 2018/0376423 | A1 | 12/2018 | Atefi |
| 2020/0037331 | A1 | 1/2020 | Chun |

FOREIGN PATENT DOCUMENTS

| | | |
|---|---|---|
| WO | WO-2015/066440 A1 | 5/2015 |
| WO | WO-2015/133648 A1 | 9/2015 |
| WO | WO-2016/175328 A1 | 11/2016 |
| WO | WO-2016/175329 A1 | 11/2016 |

OTHER PUBLICATIONS

IEEE Computer Society, "Part 11: Wireless LAN Medium Access Control (MAC) and Physical Layer (PHY) Specifications Amendment 4: Enhancements for Very High Throughput for Operation in Bands below 6 GHz", IEEE Standards Association, IEEE Std 802.11ac™-2013, pp. 1-395.

IEEE Computer Society, "Part 11: Wireless LAN Medium Access Control (MAC) and Physical Layer (PHY) Specifications", IEEE Standards Association, IEEE Std 802.11™-2012, pp. 1-2793.

Merlin et al., "Trigger Frame Format", Jul. 2015, IEEE 802.11-15/0877r0, Qualcomm, pp. 1-14.

Asterjadhi et al., "Scheduled Trigger frames—Follow up" Nov. 2015, Qualcomm, IEEE 802.11-15/1319r0, pp. 1-18.

Stacey, Robert, "Specification Framework for TGax", Intel, Jan. 2016, IEEE 802.11-15/0132r15, pp. 1-20.

Stacey, Robert, "Specification Framework for TGax", Jul. 2015, Intel, IEEE 802.11-15/0132r7, pp. 1-13.

Stacey, Robert, "Specification Framework for TGax", Mar. 2015, Intel, IEEE 802.11-15/0132-04-00ax-spec-framework, pp. 1-5.

Madhavan et al.: "ACK/BA Frame for UL MU Under Cascading Structure", IEEE 11-15-1098-01-00ax-ack-ba-frame-for-ul-mu-under-cascading-structure, Toshiba, Sep. 2015, pp. 1-11.

Stacey, Robert: "Specification Framework for TGax", IEEE 11-15-0132-07-00ax-spec-framework, Intel, Jul. 2015, pp. 1-13.

Stacey, Robert: "Specification Framework for TGax", IEEE 11-15-0132-17-00ax-spec-framework, Intel, May 2016, pp. 1-61.

* cited by examiner

| Frame Control | Duration | RA | TA | COMMON INFORMATION | TERMINAL INFORMATION 1 | ... | TERMINAL INFORMATION n | FCS |

FIG. 3

| Frame Control | Duration | RA | TA | Bitmap | COMMON INFORMATION | TERMINAL INFORMATION 1 | ... | TERMINAL INFORMATION n | FCS |

FIG. 6

WIRELESS COMMUNICATION DEVICE

CROSS-REFERENCE TO RELATED APPLICATIONS

This application is a continuation of Ser. No. 16/893,586, filed Jun. 5, 2020, which is a continuation of Ser. No. 16/368,127, filed Mar. 28, 2019, which is a continuation of U.S. application Ser. No. 15/257,464, filed Sep. 6, 2016, which is based upon and claims the benefit of priority from Japanese Patent Application No. 2015-176061, filed on Sep. 7, 2015 and No. 2016-172407 filed on Sep. 5, 2016; the entire contents of all of the above applications are incorporated herein by reference.

FIELD

Embodiments described herein relate to a wireless communication device.

BACKGROUND

There has been widely known a wireless LAN (Local Area Network) which adopts a CSMA/CA (Carrier Sense Multiple Access/Collision Avoidance) as a wireless communication system communicating between a wireless access point and a wireless terminal. The IEEE802.11ac standard adopts a downlink multiuser MIMO (DL-MU-MIMO) technology that extends a MIMO (Multi-Input Multi-Output) technology. In the DL-MU-MIMO, an access point uses a technology called beam forming to be capable of data transmission to individual wireless terminals by way of beams spatially orthogonal to each other, allowing different data to be simultaneously transmitted to a plurality of wireless terminals. This makes it possible to improve a system throughput.

Additionally, in order to attain a further high-efficiency, a task group for the IEEE802.11ax successive to the IEEE802.11ac standard has investigated a technology for aiming at the high-efficiency.

One of technology candidates for that includes an uplink multiuser MIMO (UL-MU-MIMO) technology. In the UL-MU-MIMO, a plurality of wireless terminals perform data transmission at the same timing to an access point by way of beams spatially orthogonal to each other, giving high-efficiency of the uplink transmission.

In order to sufficiently obtain benefits of spatial multiplexing by the multiuser MIMO, a user multiplexing number is preferably maintained above a certain value even in retransmitting the data. For example, assume that in a new transmission, spatial multiplexing transmission is performed by four wireless terminals, where a CRC (Cyclic Redundancy Check) error occurs in data of any only of the terminals. In this case, if the relevant data only is retransmitted, as a result, user multiplex is not performed and the system throughput decreases.

It has been known, as a method of resolving that, to newly multiplex new data in addition to retransmission data to improve a usage efficiency when the access point performs retransmission in DL-MU-MIMO transmission. This allows the user multiplexing number above a certain value to be maintained even in the retransmission. Therefore, even if the retransmission occurs, the system throughput can be improved owing to the spatial multiplexing.

However, this method is specialized for the DL-MU-MIMO without taking account of the UL-MU-MIMO. In other words, in a case of the DL-MU-MIMO transmission, the access point can perform the transmission in combination of the retransmission data and the new data based on a determination by the access point on the basis of an acknowledgement response result sent as a reply from each wireless terminal. On the other hand, in a case of the UL-MU-MIMO transmission, individual wireless terminals are multiuser MIMO transmitting devices, which means that plural transmission terminals exist. For this reason, a wireless terminal wanting to transmit the new data cannot determine whether to simultaneously multiplex the relevant new data to transmit at the same time as a wireless terminal transmitting the retransmission data. Further, in the UL-MU-MIMO, there is no scheme for multiplexing and transmitting the retransmission data and the new data by a plurality of wireless terminals. Therefore, if the data retransmission occurs, the high-efficiency UL-MU-MIMO transmission maintaining the user multiplexing number above a certain value cannot be achieved. As a user multiplexing transmission scheme, there has been known, besides the MU-MIMO, an orthogonal frequency division multiple access, in which the similar problem may also occur concerning simultaneous transmission of the retransmission data and the new data from a plurality of wireless terminals by way of an uplink OFDMA (UL-OFDMA). Note that in the UL-OFDMA, a resource unit containing one or more subcarriers is used as a minimum unit of communication resource to simultaneously receive from a plurality of wireless terminals.

BRIEF DESCRIPTION OF THE DRAWINGS

FIG. 3 is a diagram showing an example of a frame format for a trigger frame according to the first embodiment;

FIG. 6 is a diagram showing an example of a frame format for an acknowledgement response frame with notification function according to the first embodiment;

DETAILED DESCRIPTION

According to one embodiment, a wireless communication device includes a receiver configured to receive a plurality of first frames which are transmitted by multiplexing; and a transmitter configured to transmit a second frame containing check results indicating whether the plurality of first frames are successfully received and first information specifying at least one wireless communication device. The receiver is configured to receive a plurality of third frames transmitted by multiplexing in response to the second frame.

Hereinafter, embodiments of the present invention will be described with reference to the drawings. The entire contents of IEEE Std 802.11™-2012 and IEEE Std 802.11ac™-2013, known as the wireless LAN specification and IEEE 802.11-15/0132r7 dated on Jul. 20, 2015 which is Specification Framework Document directed to IEEE Std 802.11ax as a next generation wireless LAN standards are herein incorporated by reference in the present specification.

First Embodiment

Figure 1:
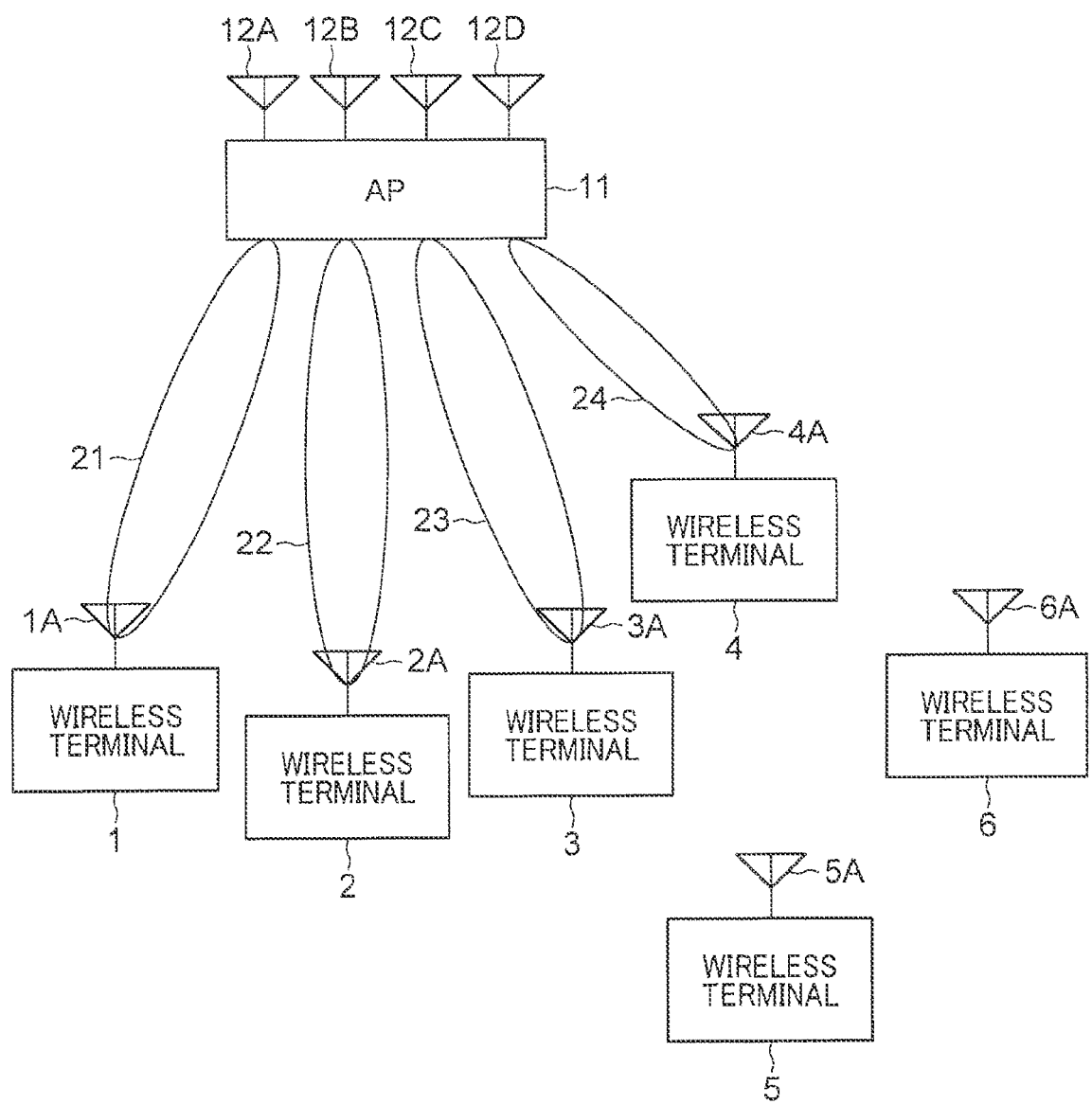
FIG. 1 is a diagram showing a wireless communication system according to a first embodiment.

FIG. 1 is a diagram showing a wireless communication system according to a first embodiment.

The wireless communication system in FIG. 1 is a wireless network which includes an access point (AP) 11 and a plurality of wireless terminals (stations) 1, 2, 3, 4, 5, and 6. The access point 11 is also one form of a wireless terminal because the access point 11 has an equivalent function to the wireless terminal except having a relaying function. The access point 11 establishes a wireless link with each of the wireless terminals 1 to 6 in accordance with IEEE 802.11 standard to perform wireless communication. The access point 11 establishes a wireless link with each of the wireless terminals 1 to 6 via a predetermined association process or the like. Note that a wireless communication scheme applicable to the embodiment is not limited to the IEEE802.11 standard and may be other schemes so long as it is a wireless communication scheme capable of an uplink user multiplexing transmission. The access point 11 includes a plurality of antennas. In the example in FIG. 1, the access point 11 includes four antennas 12A, 12B, 12C, and 12D. The access point 11 have a wireless communication device installed therein (see FIG. 7 described later).

The wireless communication device includes a wireless communicator connected with antennas 12A to 12D to transmit and receive a frame, and a controller controlling communication with the plural wireless terminals. The wireless communicator is constituted by an RF (Radio Frequency) integrated circuit, and the controller is constituted by a baseband integrated circuit, as an example, but they are not limited to this configuration.

Each of the wireless terminals 1 to 6 includes one or more antennas. In the example in FIG. 1, each of the wireless terminals 1 to 6 includes one antenna 1A, 2A, 3A, 4A, 5A, or 6A, respectively. Each wireless terminal has a wireless communication device installed therein (see FIG. 8 described later).

The wireless communication device includes a wireless communicator connected with an antenna to transmit and receive a frame, and a controller controlling communication with the access point 11. The wireless communicator is constituted by an RF (Radio Frequency) integrated circuit, and the controller is constituted by a baseband integrated circuit, as an example, but they are not limited to this configuration.

The access point 11 forms a wireless network (referred to as first network) with the wireless terminals. The access point 11 may also be connected with another network (referred to as second network) which may be wired, wireless, or a hybrid of these, separately from the first network. The access point 11 relays the communication between the first network and the second network or between the wireless terminals in the first network. A data frame occurring in each of the wireless terminals 1 to 6 is transmitted by way of the wireless communication to the access point 11, and the data frame is transmitted to other wireless terminals in the first network or the second network in accordance with a destination of the data frame. Note that the frame in the embodiment may be not only those called a frame in the IEEE802.11 standard, for example, but also those called a packet (null data packet, etc.).

An uplink user multiplexing scheme may be used in the embodiment as a method of transmitting the data frame generated in each wireless terminal to the access point 11. The user multiplexing transmission includes an uplink Multi-User-MIMO (Multi-Input Multi-Output) scheme using spatial multiplexing or an Orthogonal Frequency Division Multiple Access using frequency multiplexing. In particular, the uplink MU-MIMO is represented as UL-MU-MIMO, and a downlink MU-MIMO is represented as DL-MU-MIMO. An uplink OFDMA is represented as UL-OFDMA and a downlink OFDMA is represented as DL-OFDMA.

In UL-MU-MIMO transmission, the plural wireless terminals simultaneously transmit the plural frames as plural data streams at the same frequency band. Specifically, plural wireless terminals (e.g., wireless terminals 1 to 4) of the wireless terminals 1 to 6 each simultaneously transmit the data frame addressed to the access point 11. The access point 11 can separate the data streams on the basis of an uplink channel response (a state of uplink propagation path) with respect to the terminals to receive the frame separated for each terminal. The UL-MU-MIMO allows the plural wireless terminals to simultaneously transmit the data frame, improving the throughput.

The number of the data streams capable of being transmitted by way of the UL-MU-MIMO is limited depending on the number of the antennas included in the access point 11, and is up to the number of the antennas included in the access point 11 at a maximum. In FIG. 1, the access point 11 includes four antennas, and thus, the number of the data streams capable of simultaneous uplink transmission is four. If a terminal includes a plurality of antennas, the relevant terminal may also transmit the plural data streams. For example, one terminal may transmit two data streams and two terminals may each transmit one data stream. A combination of wireless terminals performing the UL-MU-MIMO transmission is not limited to the wireless terminals 1 to 4, and various combinations may be set from among the wireless terminals 1 to 6. Note that in FIG. 1 other wireless terminals than the wireless terminals 1 to 6 may also exist which establish the wireless link with the access point 11.

In order that the plural wireless terminals perform the UL-MU-MIMO transmission, these wireless terminals need to synchronize in a transmission timing. For this reason, as an example, a trigger frame is transmitted which includes information for identifying the wireless terminals to be instructed or authorized (hereinafter, collectively described as authorized) to perform the UL-MU-MIMO transmission (authorized terminal information). The authorized terminal information may be in any form so long as it can identify the wireless terminals to be authorized to perform the UL-MU-MIMO transmission. As an example, the authorized terminal information may be identification information for each wireless terminal to be authorized or identification information for a group including a plurality of wireless terminals to be authorized. The trigger frame may also include various pieces of information other than the authorized terminal information which are required for performing the UL-MU-MIMO transmission (e.g., information on a preamble described later, or the like). In the embodiment, one trigger frame is made to act both to notify the authorized terminal information and to adjust the transmission timing, but the frames for the respective actions may be configured to be separately transmitted.

In order to achieve the UL-MU-MIMO transmission, first, the access point 11 selects the plural wireless terminals to be authorized to perform the UL-MU-MIMO transmission. Any method of selecting the wireless terminals may be used. For example, considered are a method of selecting from among the wireless terminals which have required the transmission in advance, a method of selecting in round-robin fashion from among the wireless terminals which have established the wireless link, and the like.

Then, the access point 11 generates the trigger frame containing the authorized terminal information specifying the selected plural wireless terminals to transmit from any one antenna or the plural antennas simultaneously. A receiver address of the trigger frame is a broadcast address or a multicast address, as an example. A type of a Frame Control field of a trigger frame 71 is "Control", and a subtype thereof may have a value newly defined for the trigger frame. Alternatively, a configuration may be used in which the type and the subtype are made to have ready-made values and information is set for notifying that they are respectively a reserved field and trigger frame for a ready-made frame.

Note that, before transmitting the trigger frame, the access point 11 performs carrier sense on the basis of the CSMA/CA for a predetermined time period such as DIFS and for a back-off period defined at random, and acquires an access right (transmission right) with respect to a wireless medium if a carrier sense result is idle (that is, a CCA (Clear Channel Assessment) value is equal to or less than a threshold).

Figure 2:
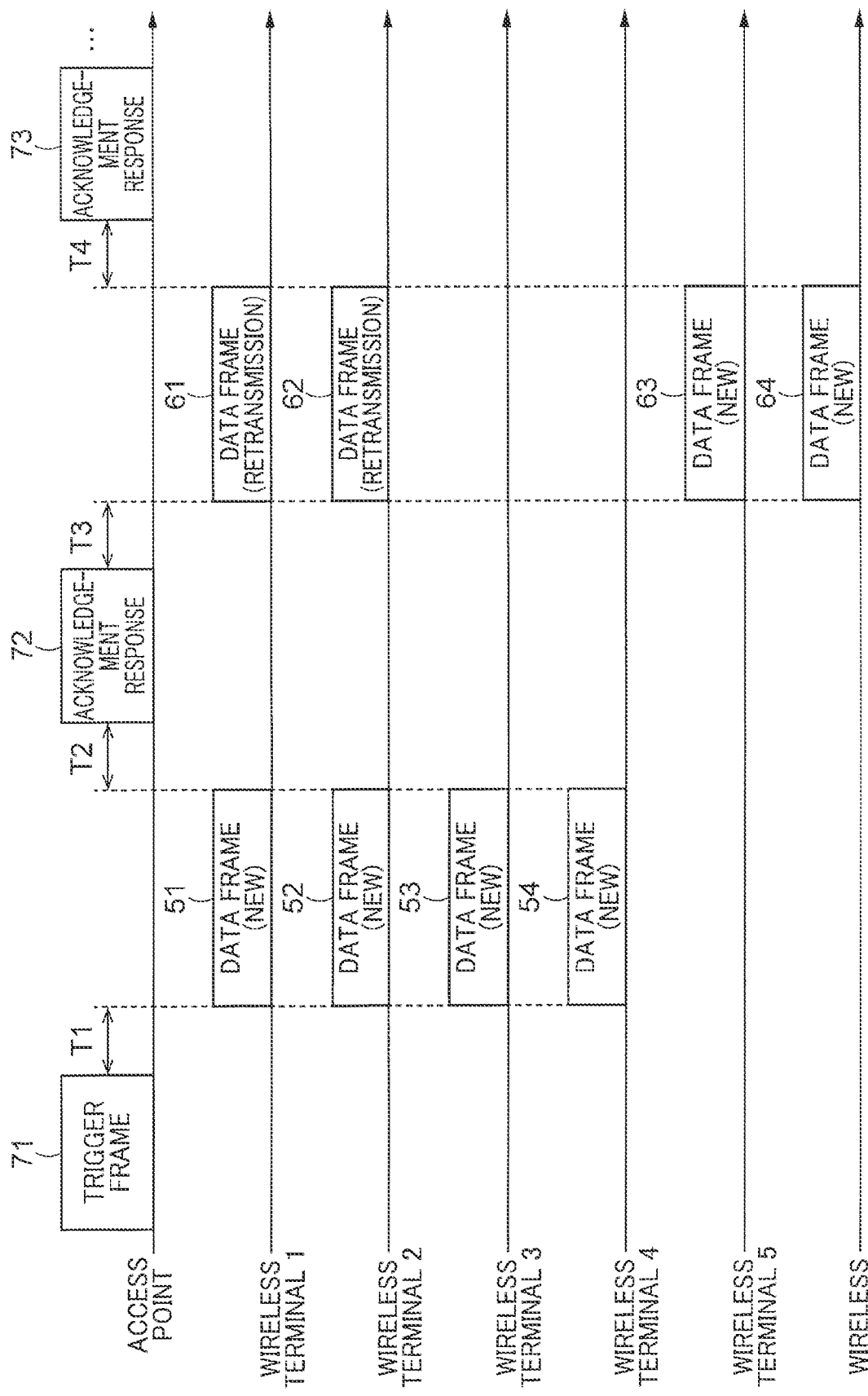
FIG. 2 is a diagram illustrating an outline of uplink multiuser MIMO transmission according to the first embodiment.

FIG. 2 shows a sequence diagram illustrating an outline of the uplink multiuser MIMO transmission according to the first embodiment.

The access point 11 selects the wireless terminals 1 to 4 as those authorized to perform the UL-MU-MIMO transmission and generates the trigger frame 71 including the authorized terminal information specifying the selected wireless terminals. The access point 11 transmits the trigger frame 71 and each of the wireless terminals 1 to 6 receives the trigger frame 71. The wireless terminals 1 to 6 analyze the authorized terminal information in the trigger frame 71 to confirm whether or not they are specified as those to perform the uplink multiuser MIMO transmission. As a result of this, the wireless terminals 1 to 4 recognize that they are specified as those to perform the uplink multiuser MIMO transmission. On the other hand, the wireless terminals 5 to 6 recognize that they are not specified as those to perform the uplink multiuser MIMO transmission.

The wireless terminals 1 to 4 transmit data frames 51 to 54 to the access point 11 at the same frequency band after elapse of a predetermined time period T1 from completion of receiving the trigger frame 71. In other words, the data frames are transmitted by way of the UL-MU-MIMO from the wireless terminals 1 to 4. The predetermined time period T1 may have any value so long as it is a predetermined time period. As an example, an SIFS (Short Inter-frame Space) time (=16 μs) may be used that is a time interval between the frames defined by the MAC protocol specification for IEEE802.11 wireless LAN, or a longer time period (which may be called xIFS where x is any integer) may be used. The plural data frames 51 to 54 may be different from or the same as each other. In a case where an expression that plural Xth frames are transmitted or received from the wireless terminals as a general expression, these Xth frames may be different from or the same as each other. "X" may be set to any value as necessary.

Note that the access point 11 may set, in the trigger frame, a timing at which each wireless terminal is to transmit the data frame or a time adjustment amount for the predetermined time period T1 above, as a modification example. In this case, each wireless terminal grasps its transmission timing on the basis of the set information in the trigger frame to transmit data frame. Note that the transmission timings of the wireless terminals may not be necessarily identical and may be adjusted individually so that reception timings at the access point are identical.

The access point 11 has to spatially separate the data frame from signals which are simultaneously received as the data stream from the wireless terminals 1 to 4. For this reason, the access point 11 uses the uplink channel response with respect to each of the wireless terminals 1 to 4. The uplink channel response may be acquired before transmitting the trigger frame as one method, and, as another method, an uplink channel response from each wireless terminal to the access point 11 may be estimated by use of a preamble added to a head side of the data frame transmitted from each of the wireless terminals 1 to 4 by way of the UP-MU-MIMO transmission. The embodiment describes the example using the latter method, but the former method may be used without any problems.

The preamble is constituted by a known bit string. The access point 11 uses the known bit string to estimate the uplink channel response, and thereby, can correctly spatially separate (decode) a field subsequent to the preamble (e.g., data field). This may be made by used of well-known measure, for example, any method such as a ZF (Zero-Forcing) method, or an MMSE (Minimum Mean Square Error) method, a maximum likelihood estimation method, or the like. A preamble field is arranged in a physical header (PHY header) arranged on a head side of a MAC frame, as an example. The terminals transmit the same signals in the fields preceding the preamble field in the physical header. The preambles of the wireless terminals need to be orthogonal to each other. The preambles being orthogonal means that the access point 11 can identify the preamble individually for each wireless terminal from the signals simultaneously received from the wireless terminals. Here, this allows the access point 11 to use the preamble for each wireless terminal to estimate the channel from each wireless terminal to the access point 11.

For orthogonalizing the preambles among the wireless terminals, any method in terms of temporal, frequency, or code may be used. In a case of temporal orthogonality, the preamble field is divided into a plurality of zones, and the terminals transmit the respective preambles in the zones different from each other. In a zone, any one terminal only transmits the preamble. In other words, a temporal position for transmitting the preamble is different between the terminals. During a time when a terminal transmits the preamble, other terminals transmit nothing. In the case of the temporal orthogonality, the preamble includes not only the data of the preamble to be transmitted, but also information concerning a time when to transmit. In a case of a frequency orthogonality, the terminals transmit the data of the preambles at frequencies in an orthogonal relationship with each other. In the frequency orthogonality, the preamble also includes information concerning a frequency at which (subcarrier) to transmit. In a case of a code orthogonality, the terminals transmit data in which arranged are plural values (symbols corresponding to the plural values) included in rows different from each other (or columns different from each other) in an orthogonal matrix. The rows (or the columns) in the orthogonal matrix are orthogonal to each other. In any of the orthogonalization methods, the access point 11 can identify the preambles of the terminals.

In order to make the preambles which are transmitted from the wireless terminals be orthogonal to each other, the wireless terminals need to be given information on the preamble transmission method. Specifically, there are required the information on at which different temporal timing the preambles are transmitted in the case of the temporal orthogonality, the information on at which different frequency the preambles are transmitted in the case of the frequency orthogonality, and the information on in which different coding pattern (which row or column pattern in the orthogonal matrix) the preambles are transmitted in the case of the code orthogonality. This information may be notified to the wireless terminals to be authorized to perform the uplink multiuser MIMO transmission by the access point 11 by use of the trigger frame. Alternatively, this information may be given to the wireless terminals through notification by other method than this. Regardless of which method to use, the wireless terminals, when performing the data transmission by way of the uplink multiuser MIMO, can grasp the preambles to be transmitted or the preamble transmission method, or the both of these in some way.

Note that the data frames 51 to 54 transmitted from the wireless terminals may has a general MAC frame structure, and may be a frame constituted by, for example, a Frame Control field, a Duration field, an RA (Receiver Address) field, a TA (Transmitter Address) field, a Frame Body field, an FCS (Frame Check Sequence) field, and the like. In this case, the data to be transmitted to the access point from each wireless terminal is stored in the Frame Body field. A MAC address of the access point is stored in the RA field, and a MAC address of the wireless terminal is stored in the TA field. The MAC address of the access point set in the TA field may be that set in the TA field of the trigger frame (see FIG. 3).

FIG. 3 shows an example of the frame format for the trigger frame. For example, the frame includes a Frame Control field, a Duration field, a RA field, a TA field, a common information field, a terminal information field, and a FCS field.

The Frame Control field is set to information indicating a frame type (i.e., Type and Subtype) or the like.

The Duration field is set to a value of medium reservation time. The device receiving the frame in which the Duration field is set to a value counts down until the time set in this field becomes zero, recognizing as being busy until becoming zero. A scheme in which the wireless medium is determined to be virtually busy like this or a period while the medium is determined to be virtually busy is called a NAV (Network Allocation Vector).

The RA (Receiver Address) field is usually set to a MAC address of a destination (destination of transmission) for the frame. Since the trigger frame is transmitted to the plural wireless terminals, the RA field may be set to a broadcast address or a multicast address. Note that, as a modification example, if a configuration can be used in which a plurality of RA fields are provided in plural, each RA field may be set to the MAC address (unicast address) of the wireless terminal.

The TA (Transmitter Address) field contains a MAC address of an originating frame. In the case of the trigger frame, the TA field is set to the MAC address of the access point or BSSID.

The common information field is set to information to be commonly notified to the wireless terminals to be authorized to perform the uplink multiuser MIMO transmission as the information required for performing the uplink multiuser MIMO transmission. For example, a value of a physical packet length (PPDU length) or a MAC frame length (MPDU (medium access control (MAC) protocol data unit) length) of the UL-MU-MIMO transmission may be set for the selected wireless terminal. The adjustment amount for the transmission timing of the UL-MU-MIMO transmission may be specified. In this case, the transmission is performed at a time shifted by the relevant adjustment amount after elapse of the predetermined time period T1 from the completion of receiving the trigger frame from the wireless terminals. In addition, as described later, the number of the terminal information fields varies, and thus, the number of the terminal information fields may be set in the common information field.

The terminal information field (individual information field) is provided for each of the wireless terminal to be authorized to perform the uplink multiuser MIMO transmission. The number of the terminal information fields varies depending on the number of the wireless terminals to be authorized to perform the uplink multiuser MIMO. In the example in FIG. 2, four terminal information fields are provided. In other words, there are provided a terminal information field 1, a terminal information field 2, a terminal information field 3, and a terminal information field 4.

The terminal information field contains the identification information for the wireless terminals specified as those to perform the uplink multiuser MIMO transmission, and individual information (e.g., the preamble transmission method, as described later) unique to the specified wireless terminals as the information which the wireless terminals require for performing the uplink multiuser MIMO transmission. As a modification example, the identification information for the wireless terminals specified as those to perform the uplink multiuser MIMO transmission may be considered to be set not in the respective terminal information fields but in the common information field. The identification information for the wireless terminal is not limited to a special one so long as it can identify the wireless terminal. For example, there can be used the MAC address or an Association ID (AID), or the both of these, and besides, some ID capable of identifying the terminal.

Figure 4:
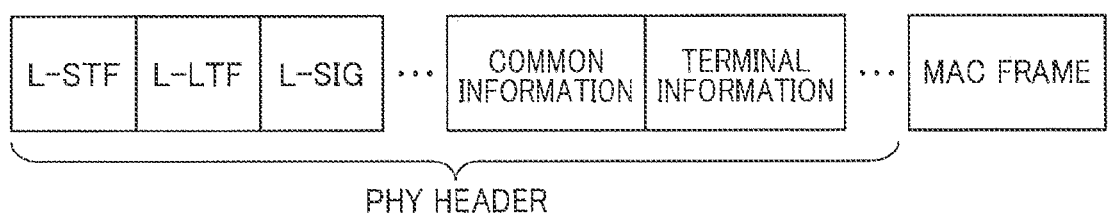
FIG. 4 is a diagram showing another example of the frame format for the trigger frame.

The terminal information fields and common information field in the trigger frame shown in FIG. 3 may be arranged in a MAC header of the MAC frame or in a frame body. In this case, the Type of the frame control field in the trigger frame may be "management". Here, a case is shown where the terminal information field and common information field are set in the MAC frame, but the terminal information field and the common information field may be set in the physical header (PHY header) which is added on the head side of the MAC frame as shown in FIG. 4 The PHY header includes an L-STF (Legacy-Short Training Field), an L-LTF (Legacy-Long Training Field), an L-SIG (Legacy Signal Field), a common information field, and a terminal information field. The L-STF, the L-LTF, and the L-SIG, which each are a field capable of being recognized by a legacy standard such as the IEEE802.11a, for example, have stored therein information such as on signal detection, frequency correction, and transmission rate. In the following description, assumed a case where the trigger frame has a format as shown in FIG. 3.

The wireless terminals receive the trigger frame having the format transmitted from the access point 11, and can grasp that they are specified as those to perform the uplink multiuser MIMO transmission if the identification information for them are contained in any of the terminal information fields (or the common information field or both of the terminal information field and the common information field), respectively. In the example, if the terminal information fields 1 to 4 are set to the identification information for the wireless terminals 1 to 4, respectively, each wireless terminal detects identification information of the self-wireless terminal in any of the terminal information fields, the wireless terminals 1 to 4 can grasp that the self-wireless terminals are specified.

If the information on the preamble used by the wireless terminals is notified by the trigger frame, the terminal information fields may be set to the information on the preamble used by the wireless terminals, respectively. Each wireless terminal transmits data frame with the preamble specified in the terminal information field containing the identification information for the self-terminal. This allows the preambles in the data frames transmitted by the wireless terminals to be transmitted in a form of being orthogonal to each other. The access point can separate the data frames received simultaneously from the wireless terminals Examples of the method for specifying the wireless terminals specified as those to perform the uplink multiuser MIMO transmission may include, in addition to the method in which the terminal information fields are set to the identification information for the wireless terminals specified as those to perform the uplink multiuser MIMO transmission, a method in which identification information of a group of the wireless terminals (which may be called group ID) is set.

The access point 11 combines the plural wireless terminals establishing the wireless link to generate one or more groups. For example, there may be a combination of the wireless terminals 1, 2, 3 and 4 as a group 1, a combination of the wireless terminals 1, 3 and 4 as a group 2, and a combination of the wireless terminals 1, 2, 4 and 5 as a group 3. The number of kinds of the group is arbitrary, and one wireless terminal may belong to the plural groups.

The access point 11 notifies a grouping result (a list of group IDs and wireless terminals) to the wireless terminals using a special frame, which allows the wireless terminals to grasp in advance to which group they belong. The access point 11 may adequately add a new group and may change the combination of the wireless terminals belonging to existing groups. The access point 11, every time adding or changing the group or the both, notifies that using the special frame.

For each group, the information on the preambles used respectively by the plural wireless terminals belonging to the same group may be notified to the wireless terminals. This information may be the same frame as the frame notifying the grouping result or may be other frame (e.g., trigger frame) than this. The preambles orthogonal to each other are specified for the wireless terminals belonging to the same group.

Each wireless terminal grasps in advance which group it belongs to and how to transmit the preamble for each group number it belongs to. For this reason, the access point 11 may only notify the group ID corresponding to the combination of the wireless terminals desired to be authorized to perform the uplink multiuser MIMO by use of the trigger frame to allow the wireless terminals to be specified which are to be authorized to perform the uplink multiuser MIMO transmission. In the case of notification of the group ID by use of the trigger frame, for example, the common information field is set to the group number. The group ID may be the same as the group ID defined by the IEEE802.11ac or may be other group ID other than this. The wireless terminal having received the trigger frame, if the group ID set in the common information field indicates the group to which it belongs, recognizes that it is the wireless terminal to be authorized to perform the UL-MU-MIMO transmission.

The FCS (Frame Check Sequence) field is set to FCS information. As an example of the FCS information, there is CRC (Cyclic Redundancy Code) information. The FCS information is used for detecting an error of the frame or the frame body field on a reception device side.

Next, a description is given of a method for the acknowledgement response by the access point 11 to the wireless terminals with respect to the data frames transmitted from the wireless terminals by way of the uplink multiuser MIMO transmission.

The access point 11 receives the data frames from the plural wireless terminals by way of the uplink multiuser MIMO transmission, and thereafter, checks a CRC (cyclic redundancy code) using the FCS fields of the received data frames. According to whether or not the data frames from the wireless terminals can be correctly received without errors, the access point 11 creates one acknowledgement response frame containing results of error detection (a success or a failure) in the data frames.

At this time, the access point 11 can contain in the acknowledgement response frame the notification information which specifies the wireless terminal(s) to be authorized to perform the uplink multiuser MIMO transmission of a new data frame, as necessary. The new data frame is a data frame other than the data frame transmitted through the last data transmission (e.g., the data frames 51 to 54 in FIG. 2). The notification information may contain information on the preamble information to be used by the specified wireless terminal(s).

Hereinafter, in some cases, the acknowledgement response frame not containing the notification information is called a usual acknowledgement response frame and the acknowledgement response frame containing the notification information is called an acknowledgement response frame with notification function for the purpose of distinction.

Figure 5:
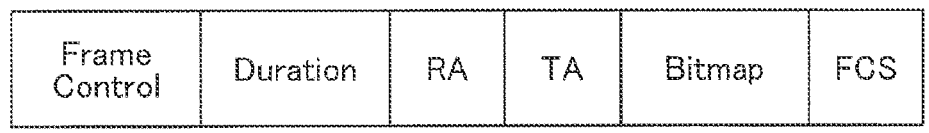
FIG. 5 is a diagram showing an example of a frame format for a usual acknowledgement response frame according to the first embodiment.

FIG. 5 shows an example of a frame format for the usual acknowledgement response frame. This frame format includes, for example, a Frame Control field, a Duration field, a RA field, a TA field, a Bitmap field, and an FCS field.

Since the acknowledgement response frame is transmitted to the plural wireless terminals, the RA field is set to the broadcast address or the multicast address as an example. Alternatively, the RA field may be set to the MAC address (unicast address) of one wireless terminal of the wireless terminals to which the acknowledgement response is transmitted. In this case, the wireless terminal stores in advance the information on other wireless terminals specified by use of the trigger frame 71 than the self-terminal, and, if this RA field is set to the address(es) of the other wireless terminal(s), interprets this acknowledgement response frame to be also directed to itself.

The Frame Control field, the Duration field, the TA field, and the FCS field are similar to the trigger frame, whose descriptions are omitted.

The Bitmap field is a field reflecting the CRC results of the data frames received from the wireless terminals by way of the uplink multiuser MIMO. Specifically, one bit in the bitmap indicates the CRC result of the received data frame. Each bit is set to "1" if CRC=OK (reception is succeeded) or "0" if CRC=NG (reception is failed). A case where "1" and "0" are inverted to each other may be acceptable. This allows that each wireless terminal receiving the acknowledgement response frame by referring to the Bitmap field can grasp a result of transmission of the data frame the wireless terminal has transmitted. Which wireless terminal check result is mapped in which bit in the bitmap may be specified in the common information field of the trigger frame in advance, may be notified in advance by use of another frame different from the trigger frame, or may be specified by other method than these. For example, a position of the terminal information field may be associated with a position of the bit in the bitmap in advance, and the terminal may grasp as the bit for itself the bit corresponding to the terminal information field in which it is specified.

FIG. 6 shows an example of a frame format for the acknowledgement response frame with notification function. The format in FIG. 6 is obtained by adding the common information field and a terminal information 1 field to a terminal information n ("n" is an integer not less than "1") field between the Bitmap field and the FCS field of the usual acknowledgement response frame shown in FIG. 5.

The added field having the same name as the field contained in the format for the trigger frame shown in FIG. 3 basically serves as the same function. By using these added fields (i.e., the common information field and the terminal information fields), the access point 11 specifies, in the acknowledgement response frame, the wireless terminals to be authorized to perform the uplink multiuser MIMO transmission of the new data frame.

Specifically, the access point 11 specifies, in the common information field or the terminal information fields (individual information fields), or the both of these in FIG. 6, the wireless terminals to be authorized to transmit the new data frame, similarly to the trigger frame. For example, the terminal information fields are set to the identification information for the wireless terminals specified as those to perform the uplink multiuser MIMO transmission, and the information required to the terminals for performing the uplink multiuser MIMO transmission. Note that the information on the wireless terminals to be authorized to transmit the new data frame may be stored in the PHY header (see FIG. 4).

Examples of the wireless terminals specified to authorize the uplink multiuser MIMO transmission by use of the acknowledgement response frame with notification function include the wireless terminal succeeding in the check result or the wireless terminal establishing the wireless link (e.g., wireless terminals 5 and 6) other than the wireless terminals previously having transmitted the data frames 51 to 54, or the both of these. The maximum number of wireless terminals capable of being specified is "the maximum number of the wireless terminals capable of multiplexing–the number of the wireless terminals performing retransmission based on the CRC result (i.e., the number of the wireless terminals of failures of CRC result)" where the sign "–" means minus. In other words, this is a value obtained by subtracting the number of the terminals of which the check results are failures from the maximum number of the terminals to which the access point 11 capable of multiplexing transmission. For this reason, in the case of specifying the wireless terminal in the terminal information field, the same maximum number of the terminal information fields may exist.

Note that in a case of the wireless terminal capable of transmitting the plural data streams (MIMO transmission) each of which data streams is capable of transmitting the different data frame, the wireless terminal may be specified as a wireless terminal to be authorized to transmit the new data frame even if the check result is a failure. For example, it is a case where the check result of one data frame is a failure and the check result of the other data frame is a success.

Additionally, the access point 11 may be configured to specify the wireless terminal to authorize the uplink multiuser MIMO transmission by setting the common information field of the acknowledgement response frame to the group ID described above. In this case, the group ID is set to a grouping ID representing a combination of the wireless terminals needing the retransmission and the wireless terminals to be authorized to transmit the new data frame, as an example. In this case, the wireless terminal having transmitted any of the data frames 51 to 54, if it belongs to the group of the group ID, can determine to retransmit the data frame because of the failed CRC result. On the other hand, the wireless terminal not belonging to the group can determine that the check result is a success. In the case of this configuration, the wireless terminal specified by use of the group ID as one to be authorized to transmit new data frame is, of the wireless terminals establishing the wireless link with the access point 11, the wireless terminal not having transmitted data frame last time (wireless terminal not having subjected to the CRC check). The use of the method described here causes the Bitmap field to be unnecessary.

Alternatively, as another method, a configuration may be used in which the wireless terminals needing the retransmission can grasp, by the Bitmap field or the like, having to do the retransmission, and thus, the common information field is set to the grouping ID representing a group of only the wireless terminals to be authorized to transmit the new data frame.

The acknowledgement response frame with notification function shown in the example of FIG. 6 may be defined as a "acknowledgement response frame" as a frame type, or as a different frame name such as a "acknowledgement response+Poll frame", for example. In the case of the former, the common information field or the terminal information field, or the both of these are added to the usual frame format in FIG. 5, as necessary. In the case of the latter, the format in FIG. 5 and the format in FIG. 6 may be defined as the frame type in the Frame Control field. In this case, the wireless terminals confirm the Frame Control field to determine to receive the frame in either format in FIG. 5 or FIG. 6. As an example, if the wireless terminal other than the wireless terminal subjected to the check receives the acknowledgement response frame, in the case of the frame type "acknowledgement response+Poll frame", it refers the common information field or the terminal information field or both of them to checks whether or not it is specified as a terminal given a transmission authorization. In the case of the frame type "acknowledgement response frame", since the terminal can grasp information for specifying the terminal not being contained, it may ignore the frame.

The access point 11 can simultaneously transmit the acknowledgement response to the wireless terminals which has performed the transmission most recently and specify the wireless terminals to transmit the new data frame, by transmitting the acknowledgement response frame in the format in FIG. 6. Therefore, the acknowledgement response frame in the format shown in FIG. 6 can be said to be a frame capable of acting as two roles of transmitting the acknowledgement response to the wireless terminals having performed the transmission most recently and specifying the wireless terminals to be authorized to transmit the new data frame.

The access point 11 may decide in any way which format of the acknowledgement response frame in FIGS. 5 and 6 is generated. For example, the usual format may be used if the check results for the all wireless terminals are failures in the reception, and in other cases, that is, if the check results for one or more wireless terminals are successes, the format with notification function may be used. The decision may be made in other ways.

The access point 11 transmits the acknowledgement response frame generated in any format in this way after elapse of the predetermined time period T2 from receiving the data frames 51 to 54 (see FIG. 2).

Here, the predetermined time period T2 may have any value so long as it is a predefined predetermined time period. As an example, an SIFS (Short Inter-frame Space) time (=16 μs) may be used that is a time interval between the frames defined by the MAC protocol specification for IEEE802.11 wireless LAN. Alternatively, the predetermined time period T2 may be a predetermined time period (xIFS) different from SIFS.

The access point 11 may perform, before the transmitting acknowledgement response frame, the carrier sense on the basis of the CSMA/CA to acquire the transmission right, and thereafter, transmit the acknowledgement response frame.

The wireless terminals previously having transmitted the data frames 51 to 54 can checks the check results for the wireless terminals included in the acknowledgement response frame to determine whether or not the access point has correctly received the data frames transmitted by them.

If the acknowledgement response frame has the usual format (see FIG. 5), the wireless terminal for which the check result represents a failure retransmits the data frame at a timing after elapse of a predefined time period T3 from receiving the acknowledgement response frame (see data frames 61 and 62 in FIG. 2). That is, in a case that the check results of the plural wireless terminals are failures, the data frames are retransmitted from the plural wireless terminals in the uplink multiuser MIMO transmission. At this time, the wireless terminal for which the check result is a success and other wireless terminal than the wireless terminals previously having transmitted the data frames 51 to 54 (the wireless terminal other than the wireless terminal subjected to the CRC check) do not perform the transmission.

Here, the time period T3 may have any value so long as it is a predetermined time period. As an example, an SIFS (Short Inter-frame Space) time (=16 μs) may be used that is a time interval between the frames defined by the MAC protocol specification for IEEE802.11 wireless LAN. Alternatively, the predetermined time period T3 may be a predetermined time period (xIFS) different from SIFS.

On the other hand, in the case of the acknowledgement response frame with notification function, the wireless terminal for which the check result is a failure retransmits the data frame at a timing after elapse of the predefined time period T3 from receiving the acknowledgement response frame, similarly to the case of the usual acknowledgement response frame (see data frames 61 and 62 in FIG. 2). The wireless terminal for which the check result is a success and other wireless terminal than wireless terminals previously having transmitted the data frames 51 to 54 (the wireless terminal not subjected to the CRC check) checks whether or not they are specified in the acknowledgement response frame. For example, the identification information for the wireless terminals and the like are checked to be set in the common information field or the terminal information field, or the both of these. Whether the acknowledgement response frame has the usual format or the format with notification function may be determined based on the frame type of the Frame Control field, for example. Alternatively, the format being used may be determined from a length of the data included the physical header, for example. The format may be determined in other ways than those described above.

The wireless terminal specified in the acknowledgement response frame with notification function transmits the new data frame at a timing after elapse of the above time period T3 from receiving the acknowledgement response frame (the same timing as for the retransmission data frame) (see data frames 63 and 64 in FIG. 2). This allows the wireless terminal specified in the acknowledgement response frame to also perform the transmission simultaneously at the transmission timing for performing the retransmission by the wireless terminal having failed in the transmission. In other words, the wireless terminal performing the retransmission and the wireless terminal specified in the acknowledgement response frame may perform the uplink multiuser MIMO transmission.

Note that if the wireless terminal transmits the plural data frames through the plural data streams (MIMO transmission), a part of the data frames may be failed in the transmission and a separate part of the data frames may be succeeded in the transmission. In this case, the wireless terminal identifies the failed data frame based on the Bitmap etc. in the acknowledgement response frame with notification function and determines whether or not the wireless terminal is specified in the terminal information field in the same frame. If the wireless terminal is specified, it simultaneously transmits (MIMO) the data frame having failed in the transmission and the new data frame through the plural data streams. In other words, the wireless terminal performs frame transmission in at least one of the case where it fails in the data frame transmission or the case where it is specified.

In the above description, the acknowledgement response frame presents the check results by means of the Bitmap one bit which indicates the CRC result for each wireless terminal, but not limited thereto, so long as a form may be used which includes the information capable of grasping the check results for the all wireless terminals having transmitted the data frames. For example, an aggregation frame (super frame) may be transmitted in which ACK (Acknowledgement) frames are aggregated for the all wireless terminals, the ACK frame being a single acknowledgement response frame including only the check result for one wireless terminal. The aggregation frame is called A-MPDU (A(Aggregated)-MPDU) in IEEE 802.11 standard.

The frames transmitted by the wireless terminal by way of the uplink multiuser MIMO may be an aggregation frame in which the plural data frames are aggregated. In other words, each wireless terminal may transmit the aggregation frame containing the plural data frames by way of the uplink multiuser MIMO. In this case, the acknowledgement response frame sent as a replay from the access point 11 needs to have a form capable of grasping the CRC results for the data frames in the aggregation frame of each wireless terminal. The method for reflecting the CRC results for the data frames in the aggregation frame may be any method as long as the correspondence can be made. Examples thereof include the same method as for a Block Ack frame defined by the MAC protocol specification for IEEE802.11 wireless LAN. Alternatively, a frame reusing the BA frame which may be called a Multi-Station Block Ack (Multi-STA BA), or an extended frame of Multi-STA BA may be used as described later.

Hereinafter, a specific example of an operation according to the system is shown with reference to FIG. 2. As described above, the wireless terminals 1 to 4 specified to be given a transmission authorization by use of the trigger frame 71 transmit the data frames 51 to 54 after elapse of the time period T1 from receiving the trigger frame 71. Assume that the access point 11 can correctly receive the data frames 53 and 54 transmitted from the wireless terminal 3 and the wireless terminal 4, respectively, but cannot correctly receive the data frames 51 and 52 transmitted from the wireless terminal 1 and the wireless terminal 2, respectively.

The access point 11 decides to generate the acknowledgement response frame in the format with notification function shown in FIG. 6. The access point 11 sets the Bitmap field of the acknowledgement response frame to the information reflecting the CRC results for the data frames transmitted from the wireless terminals, as an example. Further, the information or the like for authorizing the wireless terminal 5 and the wireless terminal 6 to transmit the new data frame is set in the acknowledgement response frame. For example, the terminal information 1 field and the terminal information 2 field of the acknowledgement response frame are set to the identification information for the wireless terminal 5 and the wireless terminal 6 and the individual information for the wireless terminals 5 and (e.g., preamble information or the like). The common information field may be set to the information such as the number of the terminal information fields or a length of a physical packet transmitted in the uplink multiuser MIMO transmission. The access point 11 transmits an acknowledgement response frame 72 set like this. The transmitted acknowledgement response frame 72 is received by the wireless terminals 1 to 4 as well as the wireless terminals 5 and 6 having established the wireless link with the access point 11.

Of the wireless terminals 1 to 6 receiving the acknowledgement response frame 72, the wireless terminals 1 to 4 determine whether or not the data frames transmitted from them are correctly received on the basis of the information in the Bitmap field. The wireless terminal 1 and the wireless terminal 2 determine that the data frames transmitted from them are not correctly received, and then, performs a process for retransmitting data frames 61 and 62 at a predetermined retransmission timing. The retransmission timing means, for example, a time after elapse of the predetermined time period T3 from receiving the acknowledgement response frame.

The wireless terminal 3 and the wireless terminal 4 determine that the data frames transmitted from them are correctly received by the access point, and then, end the transmission process.

On the other hand, the wireless terminal 5 and the wireless terminal 6, when receiving the acknowledgement response frame, determine whether or not they are authorized to perform the uplink multiuser MIMO transmission of the new data frame on the basis of the terminal information fields or the like. Here, since the terminal information fields contain the respective identification information, the terminals determine to be given a transmission authorization. The wireless terminal 5 and the wireless terminal 6 each given the transmission authorization respectively transmit data frames 63 and 64 stored in their buffer in the methods specified in the terminal information fields for them or the like after elapse of the predefined time period T3 from receiving the acknowledgement response frame. The retransmission timing referred to here means, similarly to the above case of the retransmission timing, a time after elapse of the predetermined time period T3 from receiving the acknowledgement response frame.

The preambles of the frames transmitted from the wireless terminals 1, 2, 5, and 6 are arranged so as to be orthogonal to each other, which allows the access point to grasp the information on the channel responses with the wireless terminals 1, 2, 5, and 6 and correctly separate the frames received the wireless terminals 1, 2, 5, and 6, as described above.

The access point 11 receives by way of the uplink multiuser MIMO the retransmitted data frames 61 and 62 from the wireless terminals 1 and 2, and the new data frames from the wireless terminals 5 and 6. Whether or not the data frames are normally received is checked, and the acknowledgement response frame 73 is generated which contains the check results and the notification information including the authorized terminal information which, as necessary, specifies a terminal authorized to perform the new data frame transmission. The access point 11 transmits the acknowledgement response frame 73 at a time after elapse of a predefined time period T4. The time period T4 may be SIFS or a predetermined time period (xIFS) different from SIFS. Hereafter, the similar processes are repeated.

This allows the data frames retransmitted from the wireless terminal 1 and the wireless terminal 2 and the new data frames transmitted from the wireless terminal 5 and the wireless terminal 6 to be multiplexed and transmitted at the same timing, achieving the uplink multiuser MIMO transmission. Therefore, the user multiplexing number of the uplink multiuser MIMO can be maintained above a certain value even in the retransmission.

Figure 7:
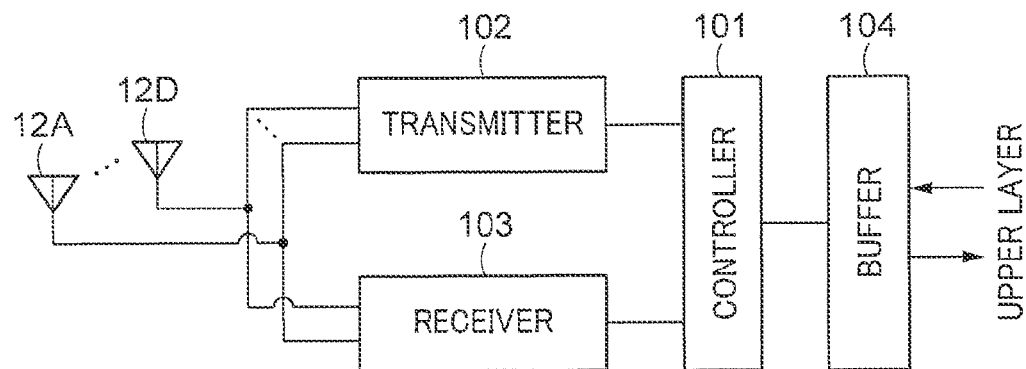
FIG. 7 is a functional block diagram of a wireless communication device installed in an access point according to the first embodiment.

FIG. 7 is a functional block diagram of the wireless communication device in the access point 11. As described above, the access point 11 may include a wireless communication device connected to the network (first network) on the wireless terminal side, and in addition to this, a wireless communication device connected to another network (second network) different from the former. FIG. 7 shows a configuration of the wireless communication device connected to the first network.

The wireless communication device includes a controller 101, a transmitter 102, a receiver 103, antennas 12A, 12B, 12C and 12D, and a buffer 104. The controller 101 controls communication with the wireless terminals, and the transmitter 102 and the receiver 103 form the wireless communicator as an example. A process of the controller 101, and all or a part of a digital region process of the transmitter 102 and receiver 103, or a process of the communication control device may be performed by software (program) executing on a processor such as a CPU, or may be performed by hardware, or may be performed by the both of these software and hardware. The access point may include a processor performing the process of the controller 101, all or a part of the transmitter 102 and receiver 103.

The buffer 104 is a storage for transferring a frame such as the data frame between an upper layer and the controller 101. The buffer 104 may be a volatile memory such as a DRAM or a non-volatile memory such as a NAND, or an MRAM. The upper layer stores the frame received from the second network in the buffer 104 for relaying to the first network, or takes in, from the controller 101, the frame received from the first network. The upper layer may perform an upper communication process than a MAC layer such as a TCP/IP or a UDP/IP. The upper layer may also perform a process of an application layer of processing the data. An operation of the upper layer may be performed by software (program) processing by a processor such as a CPU, or may be performed by hardware, or may be performed by the both of the software and the hardware.

The controller 101 mainly performs a process of the MAC layer, a part of a process of a physical layer (e.g., a process concerning the MIMO or the like). The controller 101 transmits and receives the frame via the transmitter 102 and the receiver 103 to control the communication with the wireless terminals in the first network. The controller 101 may also control so as to periodically transmit a beacon frame. The controller 101 may include a clock generator generating a clock. Additionally, the controller 101 may be configured to receive the clock externally input. The controller 101 may manage an internal time using the clock generated by the clock generator or the clock externally input, or the both of these. The controller 101 may output externally the clock created by the clock generator.

The controller 101, on receiving an association request from the wireless terminal, performs an authentication process and establishes the wireless link with the wireless terminal. The controller may perform a process such as an authentication process if necessary before receiving the association request. The controller 101 periodically confirms the buffer 104. Alternatively, the controller 101 confirms the buffer 104 by an external trigger such as the buffer 104. The controller 101, on the basis of some determination, selects the plural wireless terminals to be authorized to perform the uplink multiuser MIMO transmission from among the wireless terminals establishing the wireless link, and generates the trigger frame containing the authorized terminal information (notification information) for specifying these wireless terminals. The controller 101 sets the information for specifying the transmission method of the data frame for each wireless terminal (the common information, the individual information, or the both of these), as necessary, in the common information field, terminal information field or both of these of the trigger frame.

The controller 101 transmits the generated trigger frame from the transmitter 102 via the transmitter 102. As an example, the carrier sense is performed during DIFS and a back-off period, and if the carrier-sensing result indicates an idle state, the transmission right is acquired. Then, the controller 101 outputs the generated trigger frame to the transmitter 102. The transmitter 102, which includes transmission systems corresponding to the antennas, uses a particular transmission system or the transmission systems to subject the input trigger frame to desired processes of the physical layer such as a modulation process or adding the physical header. The transmitter 102 also subjects the frame having been subjected to the process of the physical layer to a DA conversion, a filtering process extracting signal components of a desired band, and a frequency conversion (up-conversion). The transmitter 102 amplifies the signal subjected to the frequency conversion to emit as a radio wave from any one of antennas or the antennas into the space.

The signal received by each antenna in the access point is processed in the receiver 103 for each reception system corresponding to the each antenna. For example, after transmitting the trigger frame described above, the signals of the data frames sent back from the plural wireless terminals specified in the trigger frame are simultaneously received by the antennas (uplink multiuser MIMO reception). The signals received by the antennas are input to the reception systems in the receiver 103. The received signals are respectively amplified in the reception systems, subjected to the frequency conversion (down-conversion) and the filtering process to extract the components of the desired band. The extracted signals are further converted into digital signals through an AD conversion and subjected to the process of the physical layer such as demodulation, and thereafter, respectively input to the controller 101.

The controller 101 performs the channel estimation on the basis of the preambles of the signals input from the reception systems to acquire a channel response of the uplink. The controller 101 separates data subsequent the preamble for each wireless terminal on the basis of the channel response of the uplink acquired by the estimation. This allows the access point 11 to receive the data frames simultaneously transmitted from the plural wireless terminals without involving interference.

The controller 101 generates the acknowledgement response frame based on the check results of the data frames transmitted from the wireless terminals by way of the uplink multiuser MIMO. Specifically, the controller 101 subjects the data frames received from the wireless terminals to the CRC check and generates the acknowledgement response frame in which the information indicating the CRC results are stored. The controller 101 also controls the acknowledgement response frame to be transmitted after elapse of a predetermined time period from receiving the data frames transmitted from the wireless terminals by way of the uplink multiuser MIMO.

Here, the acknowledgement response frame includes the usual acknowledgement response frame or acknowledgement response frame with notification function, as described above. In the case of generating the acknowledgement response frame with notification function, the controller 101 selects the wireless terminals to be authorized to perform the uplink multiuser MIMO transmission and adds the authorized terminal information specifying these wireless terminals to the above acknowledgement response frame.

Examples of a method for selecting the wireless terminals include any method such as a method of selecting, of the wireless terminals establishing the wireless link, from among the wireless terminals not having subjected to the CRC check (wireless terminals not having transmitted data frame last time in the uplink multiuser MUMO transmission), or from among the wireless terminals each for which the check result is a success, or from among the both of these.

The number of the selected terminals is, for example, equal to or less than a value obtained by subtracting the number of the terminals of which the check results are failures from the maximum number of the terminals to which the access point 11 is capable of spatial multiplexing.

As for a method of notifying the information specifying the selected wireless terminals, the identification information for the selected wireless terminals may be arranged in the common information field or the terminal information fields for the respective wireless terminals, or the both of these. Alternatively, the identification information of the group to which the selected wireless terminals commonly belong may be arranged in the common information field or the like.

Examples of the receiver address (RA) of the acknowledgement response frame include the broadcast address or the multicast address. Alternatively, the unicast address of one of the wireless terminals specified in the trigger frame (wireless terminals having transmitted the data frames in the uplink multiuser MIMO transmission this time) may be specified as the RA.

The transmitter 102 inputs the generated acknowledgement response frame to one of the plural transmission systems or the transmission systems. The transmission system to which the acknowledgement response frame is input modulates the input acknowledgement response frame and subjects the modulated signal to the process of the physical layer such as adding the physical header. The transmitter 102 also subjects the frame having been subjected to the process of the physical layer to the DA conversion, the filtering process extracting signal components of a desired band, and the frequency conversion (up-conversion). The transmitter 102 amplifies the signal subjected to the frequency conversion to emit as a radio wave from any one of antennas into the space.

The controller 101 may access a storage for storing the information to be transmitted to the wireless terminals or the information received from the wireless terminal, or the both of these to read out the information. The storage may be a buffer included in the controller 101 (internal memory) or a buffer provided outside the controller 101 (external memory). The storage may be a volatile memory or a non-volatile memory. The storage may also be an SSD, a hard disk or the like other than the memory.

The above described isolation of the processes of the controller 101 and transmitter 102 is an example, and another form may be used. For example, the controller 101 may perform the process until the digital region process, and the transmitter 102 may perform the DA conversion and the subsequent processes. As for the isolation of the processes of the controller 101 and receiver 103, similarly, the receiver 103 may perform the process until the AD conversion and the controller 101 may perform the digital region process including the subsequent process of the physical layer. Isolation other than those described above may be used.

Figure 8:
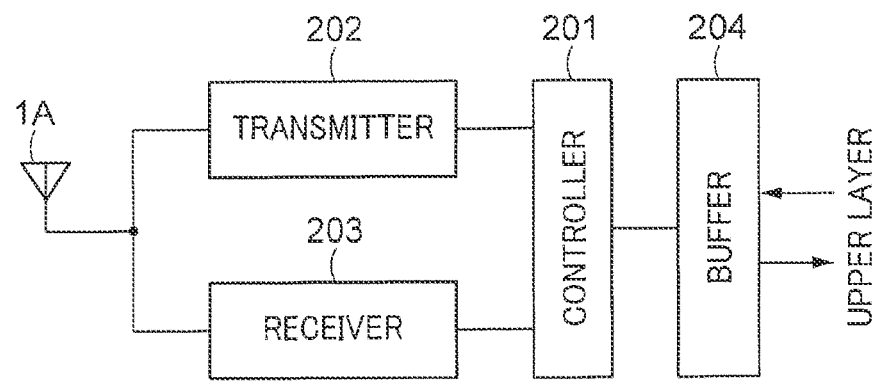
FIG. 8 is a functional block diagram of a wireless communication device installed in a wireless terminal according to the first embodiment.

FIG. 8 is a functional block diagram of the wireless communication device installed in the wireless terminal 1. The wireless communication devices installed in the wireless terminals 2 to 6 have the same configuration as the wireless terminal 1, and therefore, the description of the wireless terminal 1 is substituted for the description of the wireless terminals 2 to 6 in the following description.

The wireless communication device includes a controller 201, a transmitter 202, a receiver 203, an antenna 1A, and a buffer 204. The controller 201 controls communication with the access point 11, and the transmitter 202 and the receiver 203 form the wireless communicator as an example. A process of the controller 201, and all or a part of a digital region process of the transmitter 202 and receiver 203, or a process of the communication control device may be performed by software (program) executing on a processor such as a CPU, or may be performed by hardware, or may be performed by the both of the software and the hardware. The plural antennas may be provided other than the antenna 1A. The wireless terminal may use the plural antennas to perform the MIMO transmission of the plural data frames. The wireless terminal may include a processor performing the process of the controller 201, all or a part of the transmitter 202 and receiver 103.

The buffer 204 is a storage for transferring a frame such as the data frame between an upper layer and the controller 201. The buffer 204 may be a volatile memory such as a DRAM or a non-volatile memory such as a NAND, or an MRAM. The upper layer generates the frames or data to be transmitted to other wireless terminals, the access point 11, or a device on another network such as a server and stores the generated frames in the buffer 204, or takes in, via the buffer 204, the frames received in the first network. The upper layer may perform an upper communication process than a MAC layer such as a TCP/IP or a UDP/IP. The upper layer may also perform a process of an application layer of processing the data. A process of the upper layer may be performed by software (program) executing on a processor such as a CPU, or may be performed by hardware, or may be performed by the both of these software and hardware.

The controller 201 mainly perform a process of the MAC layer. The controller 201 transmits and receives the frames via the transmitter 202 and the receiver 203 to and from the access point 11 to control the communication with the access point 11. The controller 201 receives via the antenna 1A and the receiver 203 a beacon frame periodically transmitted from the access point 11, for example. The controller 201 may include a clock generator generating a clock. Additionally, the controller 201 may be configured to receive the clock externally input. The controller 201 may manage an internal time using the clock generated by the clock generator or the clock externally input. The controller 201 may output externally the clock created by the clock generator.

The controller 201, as an example, transmits an association request to the access point 11 to perform an association process in response to the received beacon, and establishes the wireless link with the access point 11. The controller 201 may perform a process such as an authentication process if necessary before transmitting the association request. The controller 201 periodically confirms the buffer 204. Alternatively, the controller 201 confirms the buffer 204 by an external trigger such as the buffer 204. Thereby, controller 201 checks whether data to be transmitted exist in the buffer 204. The controller 201, after confirming there are the frames or data to be transmitted to the access point 11, reads out the frames or data and transmits via the transmitter 202 and the antenna 1A in accordance with the communication scheme of use. Alternatively, in response to receiving from the access point 11 at least one of the trigger frame or the acknowledgement response frame (the usual acknowledgement response frame or the acknowledgement response frame with notification function), the controller 201 reads out the frames or data at a timing when the self-terminal is given a transmission authorization of the uplink multiuser MIMO or the retransmission timing and transmits the read frames or data via the transmitter 202 and the antenna 1A in accordance with communication scheme of use.

The transmitter 202 subjects the frames input from the controller 201 to desired processes of the physical layer such as a modulation process or adding the physical header. The transmitter 202 also subjects the frame having been subjected to the process of the physical layer to the DA conversion, the filtering process extracting signal components of a desired band, and a frequency conversion (up-conversion). The transmitter 202 amplifies the signal subjected to the frequency conversion to emit as a radio wave from the antenna into the space.

The signal received by the antenna 1A is processed in the receiver 203. For example, the signal of the trigger frame is received from the access point 11 and processed in the receiver 203. The received signal is amplified in the receiver 203, subjected to the frequency conversion (down-conversion) and the filtering process to extract the components of the desired band. The extracted signals are further converted into digital signals through an AD conversion and subjected to the process of the physical layer such as demodulation, and thereafter, input to the controller 201.

If the controller 201 detects the trigger frame on the basis of the signal input from the receiver 203, it checks whether or not the self-terminal is specified as one to perform the uplink multiuser MIMO transmission in the trigger frame. For example, the confirmation is made in terms of whether or not the identification information for the self-terminal is stored in any of the terminal information fields. Alternatively, a configuration may be used in which whether or not the identification information for the self-terminal is stored in the common information field is confirmed. Alternatively, a configuration may also be used in which the confirmation of whether the self-terminal is specified is made in terms of whether or not the group ID to which the self-terminal belongs is set in the common information field.

If the controller 201 confirms that the self-terminal is specified, it confirms, as necessary, whether or not the information on the transmission method of the uplink multiuser MIMO (the common information, the individual information) for the terminal is stored in the common information field, terminal information field, or the both of these fields of the trigger frame. If the information on the transmission method is stored, the controller 201 reads out the information on the transmission method from the corresponding field. If the read out information includes the information for identifying the preamble used for transmitting the data frame of the self-terminal, the preamble to be used is identified on the basis of the information. Note that the preamble to be used in the uplink multiuser MIMO transmission is given in advance, that preamble may be used. In this case, the preamble may be acquired by reading out a value stored in the buffer or the memory, of the both of these.

If the controller 201 confirms that the self-terminal is specified as one to perform the uplink multiuser MIMO transmission in the trigger frame, it controls such that the data frame or data stored in the buffer 204 is read out, the preamble to be used is specified, and the data frame is transmitted to access point 11 the after elapse of a predetermined time period from receiving the trigger frame. The data frame is transmitted via the transmitter 202 and the antenna 1A. The operation of the transmitter 202 is as described above.

A configuration may be used in which if a timing for the uplink multiuser MIMO transmission is specified in the trigger frame, the transmission to the access point 11 is controlled to be made at the specified timing.

The controller 201, after transmitting the data frame, waits for the acknowledgement response frame transmitted from the access point 11. If the controller 201 detects the acknowledgement response frame from the access point 11 (the usual acknowledgement response frame or the acknowledgement response frame with notification function) on the basis of the signal input from the receiver 203, it checks whether or not the data frame transmitted by the self-terminal by way of the uplink multiuser MIMO is correctly received by the access point 11 based on the relevant field of the acknowledgement response frame (the usual acknowledgement response frame and the acknowledgement response frame with notification function). For example, the bit for the self-terminal is identified from the Bitmap field of the acknowledgement response frame to make confirmation on the basis of the identified check result. The controller 201 includes a determinator determining whether or not the reception of the data frame transmitted by the self-terminal is succeeded by the access point 11.

If the controller 201 confirms that the data frame transmitted by way of the uplink multiuser MIMO is correctly received, it subjects the data frame stored in the buffer 204 to a deletion process or the like as necessary and ends the transmission process. On the other hand, if the data frame is confirmed not to be correctly received, the data frame is subjected to the retransmission process as necessary.

In the retransmission process, if a retry bit indicating the retransmission is defined in the Frame Control field of the data frame, the controller 201 controls such that the data frame not correctly transmitted has the retry bit set to "1", and thereafter the preamble to be used is specified as necessary, and is transmitted to access point 11 after elapse of a predetermined time period from receiving the acknowledgement response frame (the usual acknowledgement response frame or the acknowledgement response frame with notification function). The data frame is transmitted via the transmitter 202 and the antenna 1A. A configuration may be used in which if a timing for the uplink multiuser MIMO transmission of the retransmission data frame is specified in the acknowledgement response frame (the usual acknowledgement response frame or the acknowledgement response frame with notification function), the transmission to the access point 11 is controlled to be made at the specified timing.

If the controller 201 detects the acknowledgement response frame from the access point 11 on the basis of the signal input from the receiver 203, it confirms whether or not the frame has a field which notifies the information authorizing the uplink multiuser MIMO transmission of the new data frame (the common information field, the terminal information field, or the like). In other words, the controller 201 confirms whether or not the detected acknowledgement frame is the acknowledgement response frame with notification function. For example, the determination may be made on the basis of the Type and the Subtype of the Frame Control field, or on the basis of the data length described in the physical header, or on the basis of the both of these. If the controller 201 identifies that the frame has such a field, it confirms whether or not the self-terminal is specified as one to perform the uplink multiuser MIMO transmission on the basis of the field. The controller 201 includes a determinator determining whether or not the self-terminal is specified as one to perform the uplink multiuser MIMO transmission in the acknowledgement response frame. For example, if the identification information for the self-terminal is contained in the common information field, any of the terminal information fields, or the both of these, the controller 201 determines that the terminal is specified. Alternatively, if the group ID of the group to which the self-terminal belongs is contained in the common information field or the like, the terminal may be determined to be specified.

If the controller 201 confirms that the self-terminal is specified, similarly to the case of being specified in the trigger frame, it controls such that the data frame or data stored in the buffer 204 is read out, where the identified preamble to be used is specified as necessary, and is transmitted to access point 11 after elapse of a predetermined time period from receiving the acknowledgement response frame (the usual acknowledgement response frame or the acknowledgement response frame with notification function). The data frame is transmitted via the transmitter 202 and the antenna 1A. A configuration may be used in which if a timing for the uplink multiuser MIMO transmission is specified in the acknowledgement response frame (the usual acknowledgement response frame or the acknowledgement response frame with notification function), the transmission of the data frame to the access point 11 is controlled to be made at the specified timing.

Note that the frame transmitted by way of the uplink multiuser MIMO is described as the data frame, but various management frames or control frames other than the data frame can be transmitted by way of the uplink multiuser MIMO. The management frames or control frames are also stored in the buffer 204 as necessary, and the controller 201 may read out from the buffer 204 and transmit. The management frames or control frames may be generated when necessity to transmit them occur.

The controller 201 may access a storage for storing the information to be transmitted to the access point 11 or the information received from the access point 11, or the both of these to read out the information. The storage may be a buffer included in the controller 201 (internal memory) or a buffer provided outside the controller 201 (external memory). The storage may be a volatile memory or a non-volatile memory. The storage may also be an SSD, a hard disk or the like other than the memory.

The above described isolation of the processes of the controller 201 and transmitter 202 is an example, and another form may be used. For example, the controller 201 may perform the process until the digital region process, and the transmitter 202 may perform the DA conversion and the subsequent processes. Similarly as for the isolation of the processes of the controller 201 and receiver 203, the receiver 203 may perform the process until the AD conversion and the controller 201 may perform the digital region process including the subsequent process of the physical layer. Isolation other than those described above may be used.

Figure 9:
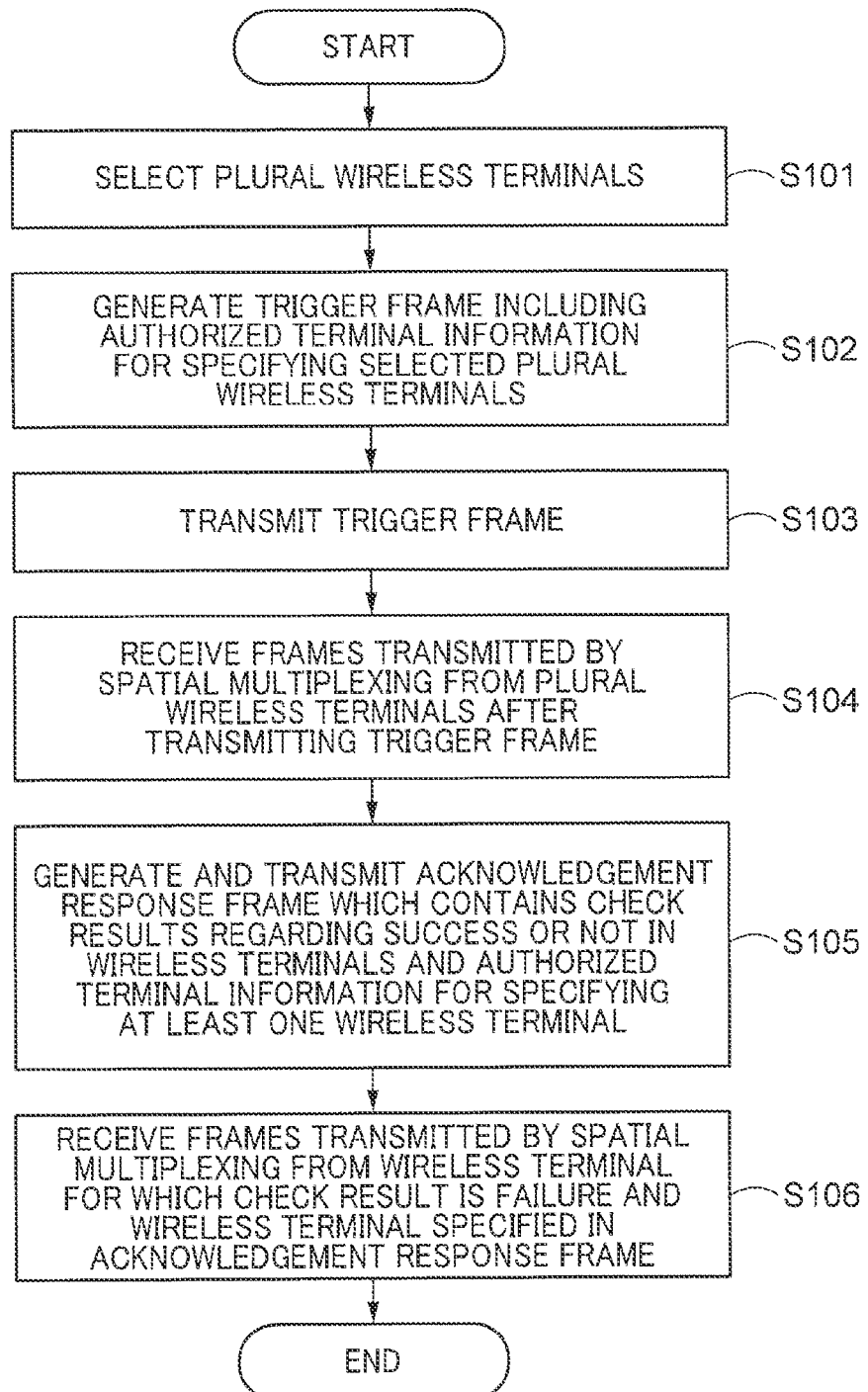
FIG. 9 is a flowchart of an operation of the access point according to the first embodiment.

FIG. 9 is a flowchart of an operation of the access point according to the first embodiment. The controller in the access point selects the plural wireless terminals (or the plural communication devices) to authorize the uplink multiuser MIMO transmission (S101), and generates trigger frame including the authorized terminal information for specifying the selected wireless terminals (S102). The controller in the access point acquires an access right for transmission and thereafter, transmits the trigger frame via the wireless communicator (S103). The trigger frame may further include other information than the authorized terminal information, for example, information on the preambles used by the plural wireless terminals.

The controller in the access point receives via the wireless communicator the frames such as the data frames respectively transmitted by the spatial multiplexing from the plural wireless terminals specified in the trigger frame after elapse of a predetermined time period from transmitting the trigger frame (S104). That is, the access point receives the frames transmitted by the uplink multiuser MIMO from the wireless terminals. The preambles of the frames received from the wireless terminals are orthogonal to each other, which makes it possible to separate even the frames simultaneously received from the wireless terminals. When the wireless terminal does not have data for transmission to the access point, it may not transmit a frame or may transmit a frame including no data such as QoS null frame.

The controller in the access point generates the acknowledgement response frame which contains the check results indicating whether or not the frames received from the wireless terminals are successfully received and the authorized terminal information for specifying at least one wireless terminal, and transmits the generated acknowledgement response frame to the wireless terminals (S105). As an example, the check results may be represented by the bitmap of a success or not in the wireless terminals.

The controller in the access point receives the frames transmitted by the spatial multiplexing from the wireless terminal for which the check result represents a failure and the wireless terminal newly specified in the acknowledgement response frame after elapse of a predefined time period from transmitting the acknowledgement response frame (S106). The preambles of these frames are arranged so as to be orthogonal to each other and therefore the access point can separate the frames each other.

Figure 10:
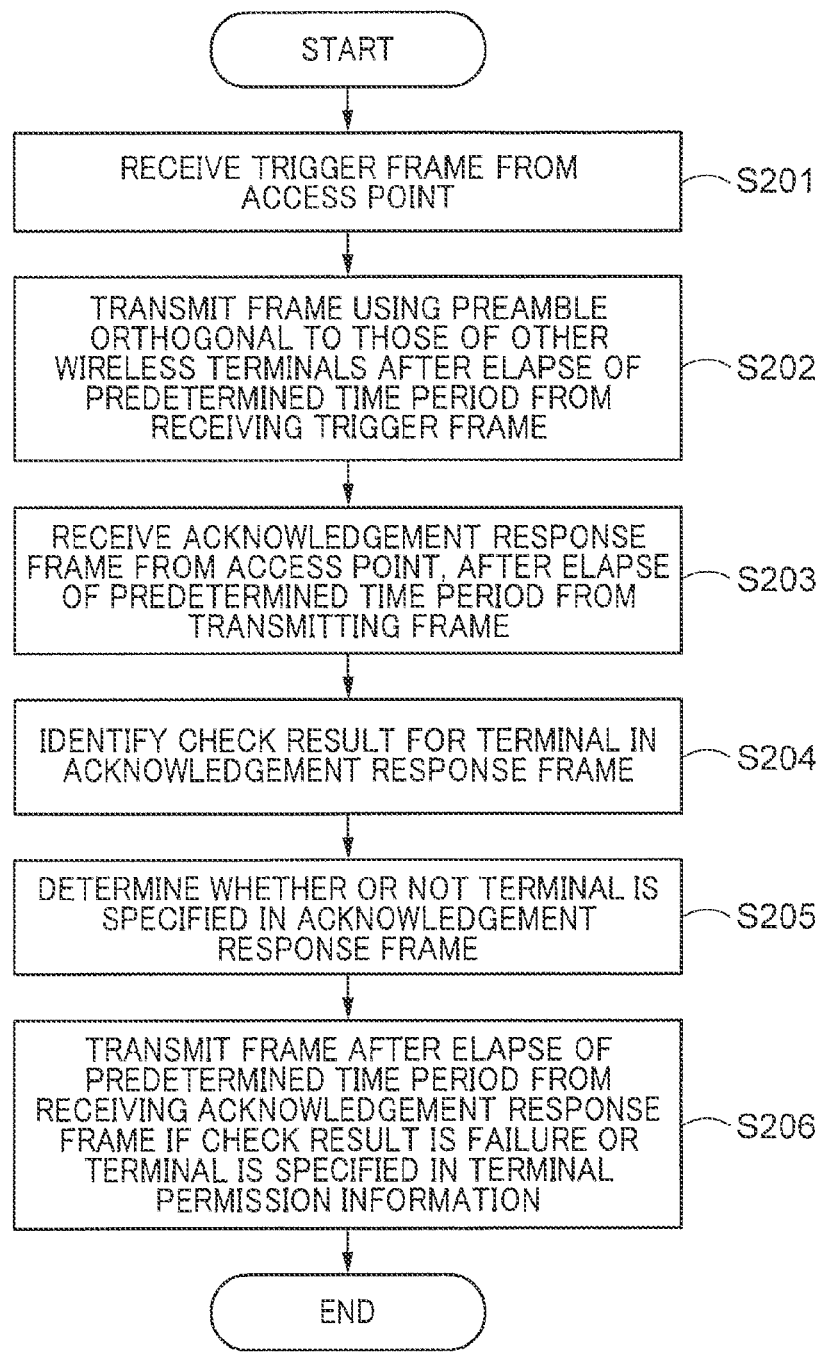
FIG. 10 is a flowchart of an operation of the wireless terminal according to the first embodiment.

FIG. 10 is a flowchart of an operation of the wireless terminal according to the first embodiment. The controller in the wireless terminal receives via the wireless communicator the trigger frame containing the authorized terminal information for specifying the plural wireless terminals, transmitted from the access point (S201). The trigger frame may include other information than the authorized terminal information, for example, information on the preamble used by each of the plural wireless terminals.

The controller in the wireless terminal receives the trigger, and when the self-terminal is specified in the authorized terminal information, transmits the frame such as the data frame via the wireless communicator after elapse of a predefined time period from receiving the trigger frame (S202). The preambles to be used of the frames transmitted from the wireless terminals are orthogonal to each other. Thereby, the transmission is performed from the wireless terminals at the same time and at the same frequency band, which causes the spatial multiplexing transmission.

The controller in the wireless terminal receives the acknowledgement response frame transmitted from the access point after elapse of a predetermined time period from transmitting the frame (S203). The acknowledgement response frame contains the check results indicating whether or not the access point successfully receives the frames from the wireless terminals, and the authorized terminal information for specifying at least one wireless terminal. The controller in the wireless terminal identifies the check result for the terminal from the acknowledgement response frame to determine whether or not the frame transmission is succeeded on the basis of the identified check result (S204). In addition, whether or not the self-terminal is specified in the authorized terminal information is determined (S205). The wireless terminal, if the check result for the terminal represents a failure or the terminal is specified in the authorized terminal information, transmits the frame via the wireless communicator after elapse of a predefined time period from receiving the acknowledgement response frame (S206). The preambles to be used of the frames transmitted from the self-terminal and other wireless terminals are specified in advance to be orthogonal to each other. This causes the spatial multiplexing transmission from the self-terminal and other wireless terminals. Note that if the check result indicates the transmission failure of the self-terminal at step S204, step S205 may be omitted. Further, the order of step S205 and step S204 may be reversed. In this case, if the self-terminal is determined to be specified at step S205, the frame transmission may be considered to be succeeded without checking the check result.

As described above, in the embodiment, by the acknowledgement response frame, with respect to the UL-MU-MIMO transmission, including the check results for the wireless terminals and the information specifying the wireless terminals to be authorized to perform the new transmission, the retransmission data frame and the new data frame can be subjected to the user multiplexing transmission (UL-MU-MIMO transmission). This allows the user multiplexing number to be maintained above a constant value even if the wireless terminal performing the retransmission exists, improving the system throughput owing to the high-efficiency.

In the embodiment described above, the case of the UL-MU-MIMO transmission is described as the uplink user multiplexing transmission scheme, but the case of the UL-OFDMA transmission may also be applicable similarly. The UL-OFDMA is a communication scheme in which one or more subcarriers are allocated as the resource units (which may be referred to as subchannel, resource block, frequency block, and the like) to the terminal, the receptions from the plural wireless terminals are simultaneously performed on the resource unit basis. The resource unit is a frequency component in a minimum unit of the resource for performing the communication.

Figure 11:
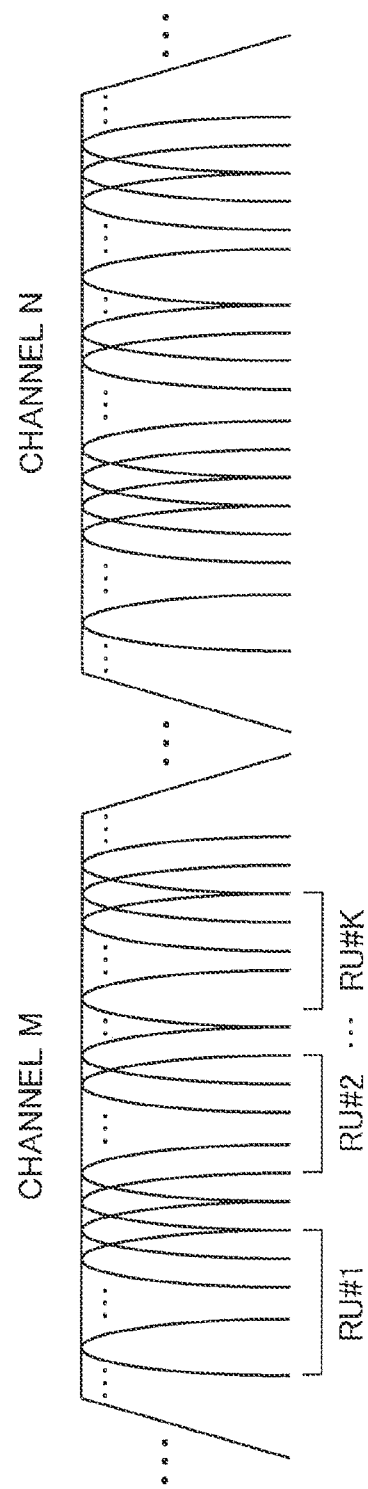
FIG. 11 is a diagram showing an example of a plurality of resource units secured in continuous frequency domains within one channel.

FIG. 11 illustrates the resource units (RU #1, RU #2 . . . RU #K) arranged within a continuous frequency domain of one channel (which is described here as the channel M). A plurality of subcarriers orthogonal to each other are arranged in the channel M, and a plurality of resource units including one or a plurality of continuous subcarriers are defined within the channel M. Although one or more subcarriers (guard subcarriers) may be arranged between the resource units, presence of the guard subcarrier is not essential. A number for identification of the subcarrier or the resource unit may be assigned to each carrier or each resource unit in the channel. The bandwidth of one channel may be for example, though not limited to these, 20 MHz, 40 MHz, 80 MHz, and 160 MHz. One channel may be constituted by combining a plurality of channels of 20 MHz. The number of subcarriers in the channel or the number of resource units may vary in accordance with the bandwidth. A minimum width of the resource unit may be defined such that a plurality of resource units having the minimum width are coupled to configure one resource unit. Uplink OFDMA communication is realized by different resource units being simultaneously used by different terminals. Note that the resource unit may be a channel of 20 MHz, and the resource unit may be allocated to each terminal in a unit of channel of 20 MHz.

The data stream from the wireless terminals is spatially separated by use of the preamble in the case of the UL-MU-MIMO, but the terminal may be separated by use of the resource unit in the case of the UL-OFDMA. Since the resource units are orthogonal in terms of frequency, the different resource units do not interfere with each other, and the access point can simultaneously communicate with the plural wireless terminals. In the sequence in FIG. 2, in the case where the UL-OFDMA is used as the user multiplexing transmission scheme, the access point specifies, in the terminal information fields of the trigger frame 71, information identifying the resource unit for each wireless terminal instead of the preamble. The wireless terminals 1, 2, 3, and 4 may use the resource unit specified in the corresponding terminal information field of the trigger frame to transmit the data frames 51 to 54. Replacing the UL-MU-MIMO with the UL-OFDMA like this may be also applied in an embodiment described later.

Besides, a communication scheme may be applicable in which the OFDMA and the MU-MIMO (Multiple-Input Multiple-Output) are combined (referred to as OFDMA & MU-MIMO). In the case of the OFDMA & MU-MIMO, the plural terminals use the same resource unit to perform the MU-MIMO transmission.

Second Embodiment

In the first embodiment, the wireless terminals of which the check results represent failures in the acknowledgement response frame (wireless terminals 1 and 2 in FIG. 2) retransmit (by way of UL-MU-MIMO transmission) the data frames after the completion of receiving the acknowledgement response frame. In other word, the check result of failure has a role to implicitly give an instruction or authorization of the next UL-MU-MIMO transmission after elapse of a predetermined time period from the completion of receiving the acknowledgement response frame.

In the embodiment, the wireless terminals to be instructed or authorized (hereinafter, collectively described as authorized) to perform the UL-MU-MIMO transmission after the completion of receiving the acknowledgement response frame are all specified in the terminal information fields or the common information field. The wireless terminal not specified in the terminal information field nor common information field is assumed to be not authorized to perform the UL-MU-MIMO transmission even if the check result is a failure. In this way, the wireless terminal authorized to perform the UL-MU-MIMO transmission is explicitly specified in the terminal information field or the common information field.

The wireless terminal authorized, by use of the terminal information field or common information field of the acknowledgement response frame, to perform the UL-MU-MIMO transmission transmits the frame after elapse of a time period T3 from the completion of receiving the acknowledgement response frame. The preamble used for transmitting the frame is orthogonal to the other authorized wireless terminals as is in the first embodiment. The frame transmitted by the wireless terminal of which the check result is a failure may be a retransmission frame of the transmission-failed frame or other new frame than this. If the sequence in FIG. 2 is described in terms of the embodiment, the wireless terminals 1 and 2 having failed in transmitting the data frames 51 and 52 recognize that the transmission was failed through the bitmap of the acknowledgement response frame 72. Then, for example, each terminal checks whether or not there is a field set to its identifier in the terminal information fields 1 to N to detect the field set to its identifier, and thereby, grasps that authorization of the UL-MU-MIMO transmission is given thereto. After elapse of a time period T3 from the completion of receiving the acknowledgement response frame 72, the terminals transmit the data frames 61 and 62. The data frames 61 and 62 are the retransmission frames of the data frames 51 and 52 in the example in FIG. 2, but are not necessarily limited thereto and may be new data frames. After transmitting the new data frames, the retransmission frames of the data frames 51 and 52 may be transmitted at another occasion of transmission.

Figure 12:
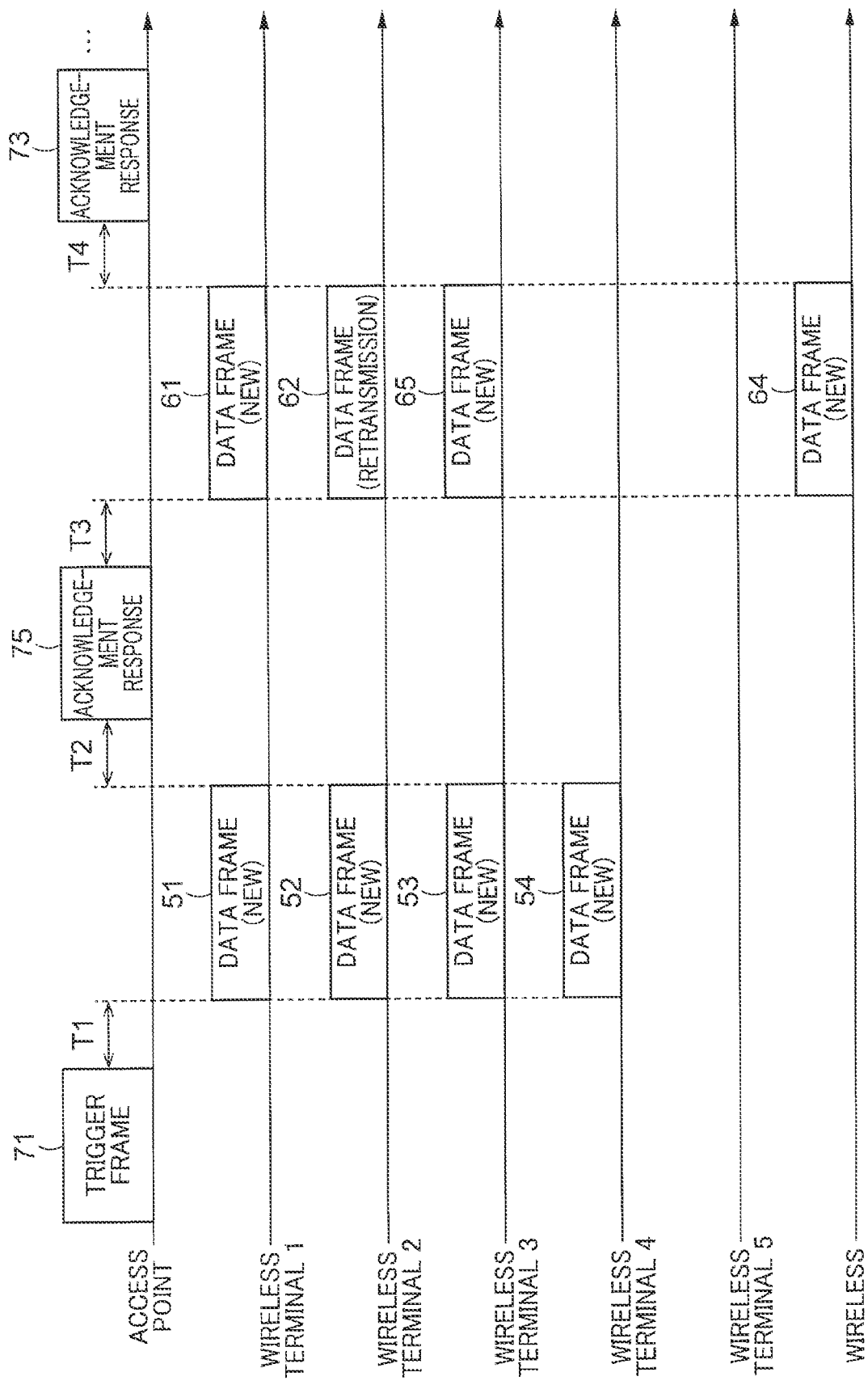
FIG. 12 is a diagram showing an exemplary sequence of an operation according to a second embodiment.

Additionally, the wireless terminal authorized, by use of the acknowledgement response frame, to perform the UL-MU-MIMO transmission may be the wireless terminal of which the check result is a success. An exemplary sequence in this case is shown in FIG. 12. At least one of the wireless terminals 3 or 4 having succeeded in transmitting the data frames 53 and 54 may be again authorized, by use of the acknowledgement response frame, to perform the UL-MU-MIMO transmission. In the example in FIG. 12, the wireless terminal 3 having succeeded in transmitting the data frame 53 is again authorized, by use of a acknowledgement response frame 75, to perform the UL-MU-MIMO transmission and transmits a data frame 65. In addition, the wireless terminals 1 and 2 having failed in transmitting the data frames 51 and 52 and the wireless terminal 6 not specified in the trigger frame 71 are also authorized. Although the wireless terminal 1 failed in transmitting the data frame 51, it transmits not the retransmission frame of the data frame 51 but a new data frame 66. The wireless terminal 2 failed in transmitting the data frame 52 and then transmits the retransmission frame 62 of the data frame 52.

Figure 13:
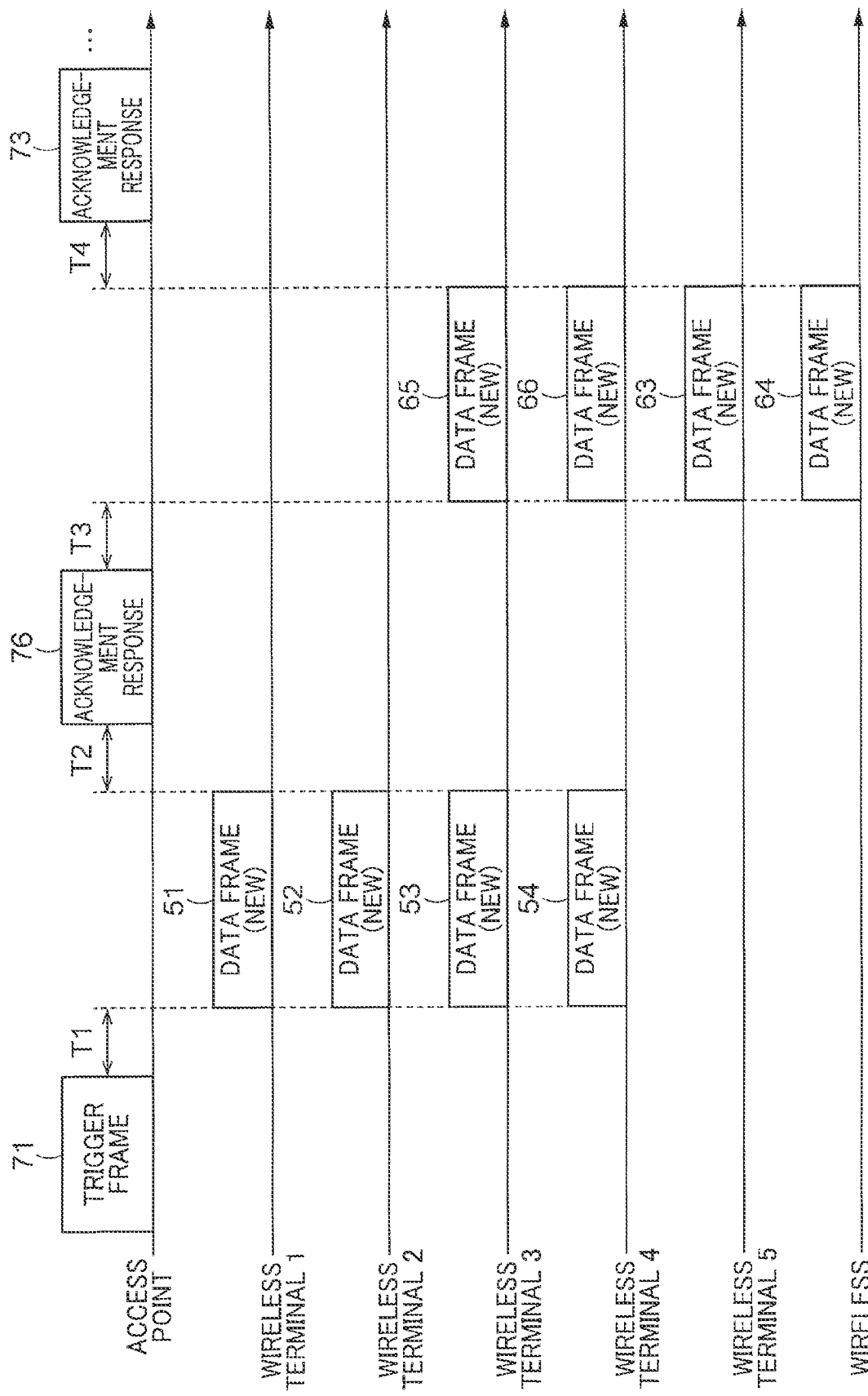
FIG. 13 is a diagram showing an exemplary sequence of other operation according to the second embodiment.

The wireless terminal authorized, by use of the acknowledgement response frame, to perform the UL-MU-MIMO transmission may be selected from among the wireless terminals other than the wireless terminal of which the check result is a failure. An exemplary sequence in this case is shown in FIG. 13. In this case, the wireless terminals 3 and 4 having succeeded in transmitting the data frames 53 and 54 and the wireless terminals 5 and 6 not specified in the trigger frame 71 are authorized, by use of the acknowledgement response frame 76, to perform the UL-MU-MIMO transmission. After elapse of a time period T3 from the completion of receiving the acknowledgement response frame 76, the wireless terminals 3, 4, 5, and 6 transmit the data frames 65, 66, 63 and 64.

Figure 14:
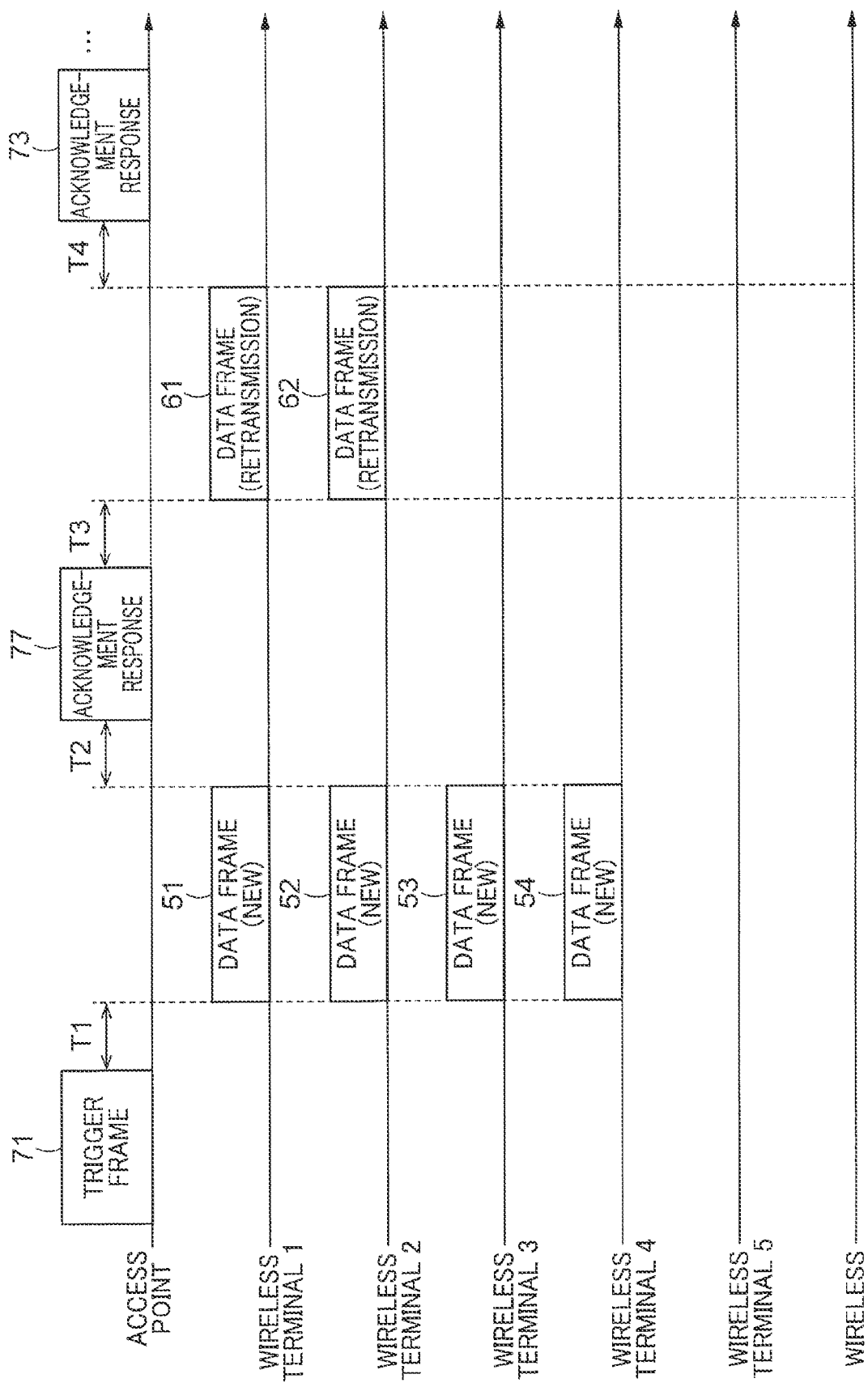
FIG. 14 is a diagram showing an exemplary sequence of other operation according to the second embodiment.

Additionally, the wireless terminal authorized, by use of the acknowledgement response frame, to perform the UL-MU-MIMO transmission may be selected from among the wireless terminals of which the check results are failures. An exemplary sequence in this case is shown in FIG. 14. In this example, only the wireless terminals 1 and 2 having failed in transmitting the data frames 51 and 52 are authorized, by use of a acknowledgement response frame 77, to perform the UL-MU-MIMO transmission. In a case where there is no wireless terminal requiring the transmission of the new data, the access point may specify only the wireless terminal needing the retransmission like this. Moreover, since the reduced number of the terminals performing the UL-MU-MIMO transmission can reduce the interference between the data streams from the plural terminals, preferential retransmission of the data frame by selecting only the wireless terminal needing the retransmission may be effective even in the case where there is a wireless terminal requiring the transmission of the new data. In the case where the UL-OFDMA is used as the uplink multiplexing transmission scheme, the transmission may be advantageously completed earlier if the number of the terminals authorized to perform the UL-OFDMA transmission is reduced, because the smaller the number of the terminals, the larger the resource (frequency band) one terminal can use.

Third Embodiment

The first and second embodiments show the case where the acknowledgement response frame is constituted by one MAC frame (MPDU). In other words, set in one MAC frame are the information concerning a success or a failure of the wireless terminals (bitmap) and the authorized terminal information that is the information on the wireless terminals authorized to perform the uplink transmission. In the embodiment, the acknowledgement response frame is constituted as the aggregation frame (A-MPDU), and the acknowledgement response frame and the trigger frame are stored in the aggregation frame. The information concerning a success or a failure of the wireless terminals is set in the acknowledgement response frame and the authorized terminal information is set in the trigger frame. The structure of the trigger frame may be similar to the first and second embodiments (see FIG. 3 or 4).

Figure 15:
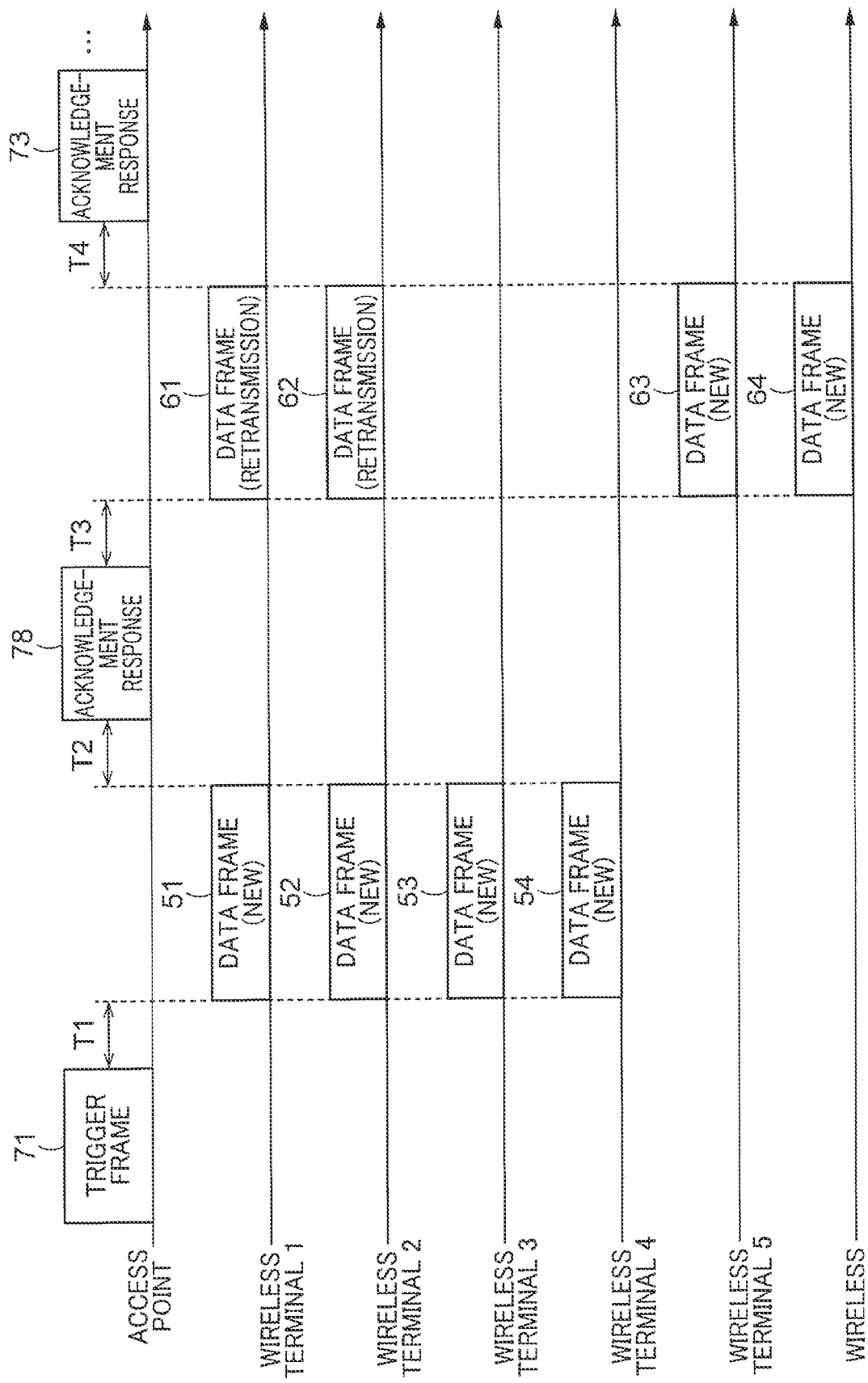
FIG. 15 is a diagram showing an exemplary sequence of an operation according to a third embodiment.
Figure 16:
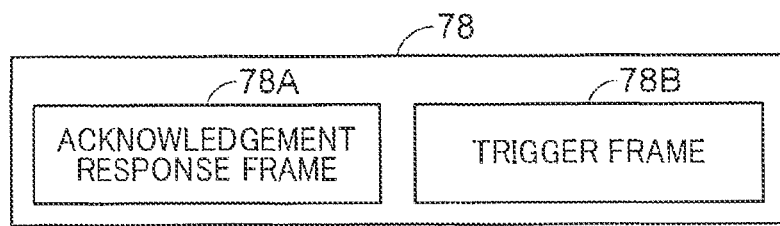
FIG. 16 is a diagram schematically showing a structure of an aggregation frame.

FIG. 15 shows an exemplary sequence of an operation according to a third embodiment. The transmission of the acknowledgement response frame 72 in FIG. 2 is changed into transmission of an aggregation frame 78. The aggregation frame 78 may be structured as an A-MPDU based on the IEEE802.11 standard, as an example. The aggregation frame 78 is structured such that a acknowledgement response frame 78A is conjunct with a trigger frame 78B, as shown in FIG. 16. A delimiter not shown in the figure is arranged between the acknowledgement response frame 78A and the trigger frame 78B, which allows both frames to be distinguished. Note that actually the physical header is added to a head side of the aggregation frame 78. The acknowledgement response frame and the trigger frame may be reversed in a conjunct order.

The structure of the acknowledgement response frame 78A may be the same structure as the normal acknowledgement response frame in FIG. 5, as an example. A way of setting the fields may be also the same way as of the normal acknowledgement response frame in FIG. 5. The trigger frame 78B may be the same structure as the trigger frame in FIG. 3, as an example. A way of setting the fields may be also the same way as of the trigger frame in FIG. 3. In the sequence in FIG. 15, the wireless terminals 1 to 4 which are authorized by use of the trigger frame 71 to perform the transmission and have performed the UL-MU-MIMO transmission confirm the bitmap of the acknowledgement response frame 78A in the aggregation frame 78 to confirm the transmission results of the terminals (a success or a failure). Other wireless terminals 5 and 6 than the above ignore the acknowledgement response frame 78A. The trigger frame 78B in the aggregation frame 78 is confirmed by all the wireless terminals 1 to 6 receiving the aggregation frame 78 to confirm whether or not the terminals are authorized to perform the UL-MU-MIMO transmission. In the example in FIG. 15, the wireless terminals 1, 2, 5, and 6 are authorized and these terminals transmit (by way of the UL-MU-MIMO transmission) the data frames 61, 62, 63 and 64 after elapse of the time period T3 from the completion of receiving the aggregation frame 78. Here, the aggregation frame in which the acknowledgement response frame is conjunct with the trigger frame is transmitted from the access point, but the aggregation frame in which the plural data frames conjunct with each other may be transmitted in the UL-MU-MIMO transmission from each of the plural wireless terminals to the access point.

Figure 17:
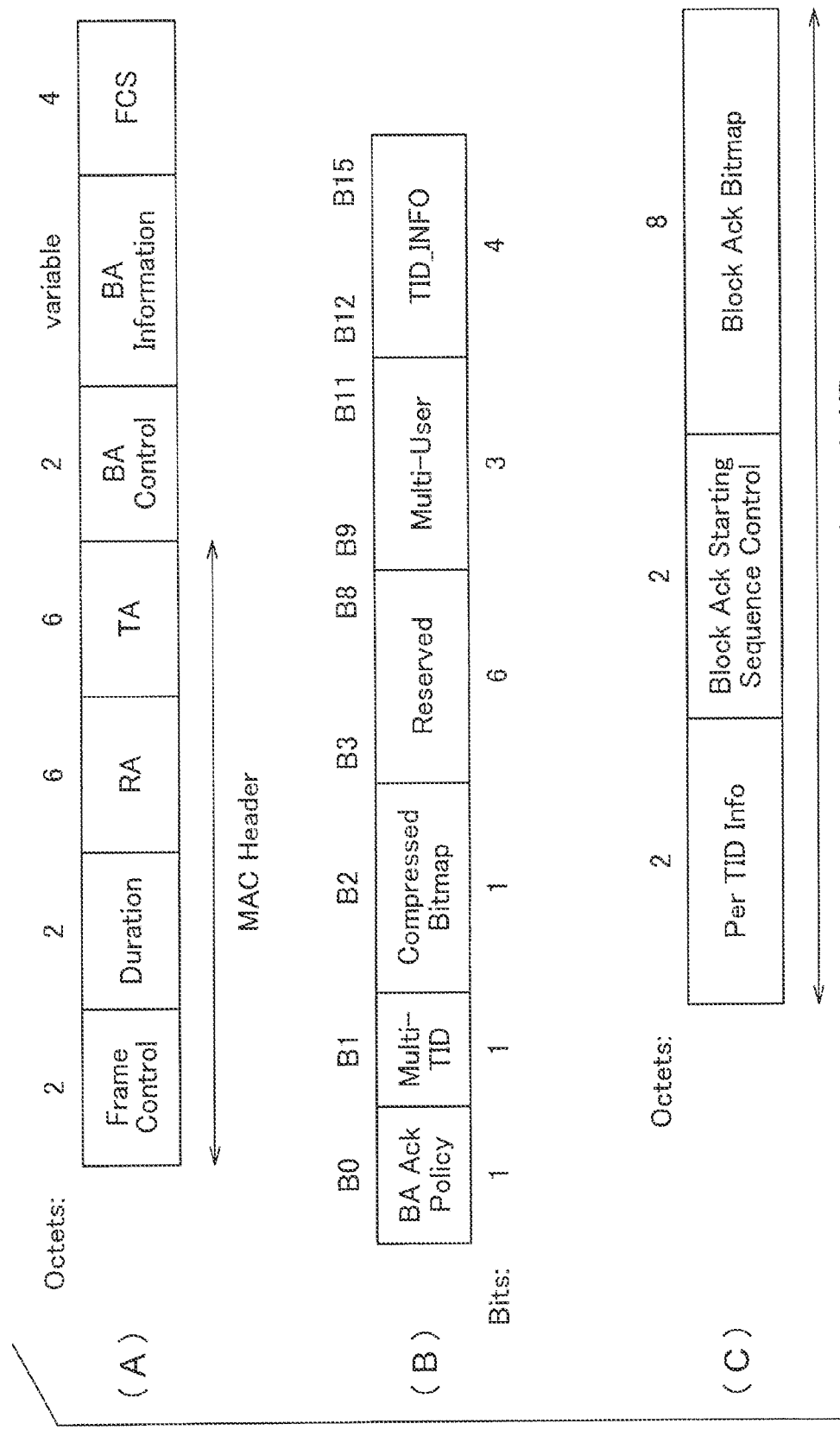
FIG. 17 is a diagram showing an exemplary structure of a Block Ack frame.

The acknowledgement response frame 78A may be structured not in the form shown in FIG. 5, but by reusing the Block Ack frame (BA frame). In the case of reusing the BA frame, the frame type may be "Control" and a frame subtype may be "BlockAck", similarly to the normal BA frame. A frame reusing the BA frame in this way may be called a Multi-Station Block Ack (Multi-STA BA). FIG. 17(A) shows an exemplary frame format in the case of reusing the BA frame. FIG. 17(B) shows an exemplary frame format of a BA Control field of the BA frame, and FIG. 17(C) shows an exemplary frame format of a BA Information field of the BA frame. In the case of reusing the BA frame, an indication may be in the BA Control field that the BA frame format is that extended for notifying the acknowledgement response regarding the plural wireless terminals. For example, in the IEEE802.11 standard, a case where a Multi-TID subfield is 1 and a Compressed Bitmap subfield is 0 is reserved. This may be used in order to indicate that the BA frame format is that extended for notifying the acknowledgement response regarding the plural wireless terminals. Alternatively, an area of bits B3-B8 is a reserved subfield in FIG. 17(B), but all or a part of this area may be defined in order to indicate that the BA frame format is that extended for notifying the acknowledgement response regarding the plural wireless terminals. Alternatively, the notification as described here may not be necessarily made explicitly.

The RA field of the BA frame may be set to a broadcast address or multicast address similar to the normal acknowledgement response frame in FIG. 2. Alternatively, the field may be set to a unicast address of one of the wireless terminals having performed the UL-MU-MIMO transmission. The Multi-User subfield in the BA Control field may be set to the number of the users (number of the terminals) to be reported by means of the BA Information field. In the BA Information field, there are arranged for each user (wireless terminal), a subfield for setting an Association ID (AID) (described as "Per TID Info" in FIG. 17(C)), a Block Ack Starting Sequence Control subfield, and a Block Ack Bitmap subfield.

The Association ID subfield is set to an AID for identifying the user. The Block Ack Starting Sequence Control subfield and the Block Ack Bitmap subfield may be omitted if the frame transmitted by the wireless terminal is a single data frame (that is, if not the aggregation frame). If the frame transmitted by the wireless terminal is the aggregation frame, the Block Ack Starting Sequence Control subfield stores therein a sequence number of the first MSDU (medium access control (MAC) service data unit) in the acknowledgement response shown by the relevant Block Ack frame. The Block Ack Bitmap subfield may be set to a bitmap (Block Ack Bitmap) constituted by bits of reception success or failure for the sequence numbers subsequent to the Block Ack Starting Sequence number.

If the acknowledgement response frame 78A is a frame in the case of reusing the BA frame, the terminal receiving this acknowledgement response frame 78A confirms the type and subtype of a Frame Control field of the acknowledgement response frame 78A. If the terminal detects that these are "Control" and "BlockAck", then the terminal confirms the RA field and, on the basis of that the value of the RA field is the broadcast or the like, identifies from the Block Ack Bitmap field the information concerning a success or a failure with respect to the data frames in the frame (here, aggregation frame) transmitted by itself to determine transmission success or failure of the data frames. For example, the terminal identifies the TID Info subfield storing its AID from within the BA Information field, identifies the value (starting sequence number) set in the Block Ack Starting Sequence Control subfield subsequent to the identified TID Info subfield, and identifies from the Block Ack Bitmap the transmission success or failure of the sequence numbers subsequent to the starting sequence number. A bit length of the AID may be shorter than a length of the TID Info subfield, the AID may be stored in a part of the area of the TID Info subfield (e.g., the first 11 bits (B0-B10) of 2 octets (16 bits)), for example.

The acknowledgement response reusing the BA frame in the case where the plural wireless terminals transmit not the aggregation frame but a single data frame may be made as below, for example. One bit in the TID Info subfield of each BA Information field (e.g., the 12th bit (B11, if the first bit is B0) from the head of 2 octets (16 bits)) is used as a bit indicating "ACK" or "BA" (ACK/BA bit) and the relevant bit is set to a value indicating "ACK". If the value indicating "ACK" is set, the Block Ack Starting Sequence Control subfield and the Block Ack Bitmap subfield are omitted. This allows notification of "ACK" for the plural terminals by means of one BA frame. If the plural wireless terminals transmit the aggregation frame as described above, the ACK/BA bit may be set to a value indicating "BA".

This allows the acknowledgement response to the plural wireless terminals by reusing the BA frame even if the plural wireless terminals transmit either the aggregation frame or the single data frame.

Figure 18:
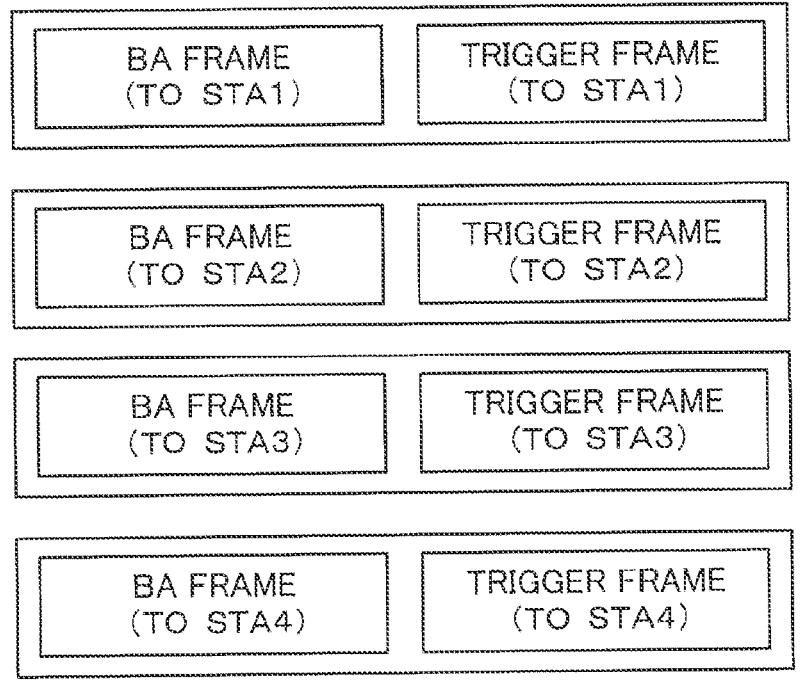
FIG. 18 is a diagram showing an example of frame transmission according to a third embodiment.

In the above description, the aggregation frame 78 is commonly transmitted to the wireless terminals 1 to 6, but the different aggregation frame may be transmitted for each wireless terminal by way of the DL-MU-MIMO transmission. For example, assume that the aggregation frame (plural conjunct data frames) is received from the wireless terminals 1 to 4, to each of which the aggregation frame is transmitted in which the BA frame is conjunct with the trigger frame. In this case, as shown in FIG. 18, the aggregation frames containing the BA frame and the trigger frame are generated for the respective wireless terminals and then transmitted respectively to the wireless terminals 1 to 4 by way of the DL-MU-MIMO transmission. The BA frame in each aggregation frame is a frame differentiated for each wireless terminal, and the RA field is set to the MAC address of the corresponding wireless terminal. The trigger frame in each aggregation frame is also a frame differentiated for each wireless terminal, and the RA field is set to the MAC address of the corresponding wireless terminal. As a modification example, these RA fields may be also set to the broadcast address or the multicast address. As another modification example, each of these RA fields may be set to the MAC address of the corresponding wireless terminal, and the BA Information field of the BA frame in each aggregation frame or the terminal information field of the trigger frame may be set to information on the all wireless terminals.

Figure 19:
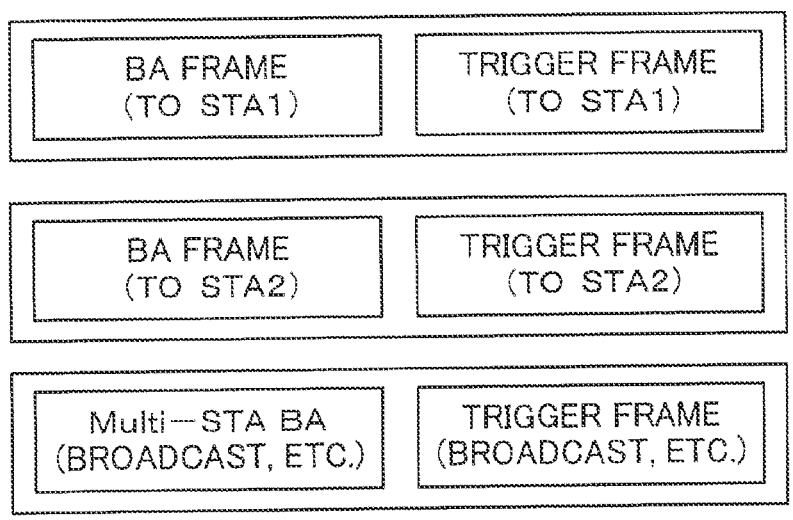
FIG. 19 is a diagram showing another example of the frame transmission according to the third embodiment.

Alternatively, a configuration may be used in which the DL-MU-MIMO transmission is performed such that the aggregation frame for each wireless terminal is transmitted to a part of the wireless terminals by way of unicast transmission and the aggregation frame is transmitted to other wireless terminals by way of broadcast transmission. For example, the DL-MU-MIMO transmission to the wireless terminals 1 to 4 may be performed in such a way that the access point receives the aggregation frame (plural conjunct data frames) from the wireless terminals 1 to 4, subjects to beam transmission the aggregation frame in which the BA frame is conjunct with trigger frame to the wireless terminals 1 and 2 respectively by way of the unicast, and subjects to the beam transmission the aggregation frame in which the Multi-Station Block Ack (Multi-STA BA) is conjunct with the trigger frame to the wireless terminals 3 and 4 respectively by way of the broadcast. FIG. 19 shows an example of the frame transmitted by the access point by way of the DL-MU-MIMO transmission in this case. The frame at the lowermost in FIG. 19 is subjected to the beam transmission commonly to the wireless terminals 3 and 4, and the frames at the uppermost and middle in FIG. 19 are subjected to the beam transmission to the wireless terminals 1 and 2, respectively. Note that for the beam transmission from the access point to the wireless terminal, a downlink channel response is required between the antennas of the access point and the antenna of each wireless terminal, but the relevant downlink channel response is assumed to be acquired by the access point in advance by means of a procedure such as sounding.

Figure 20:
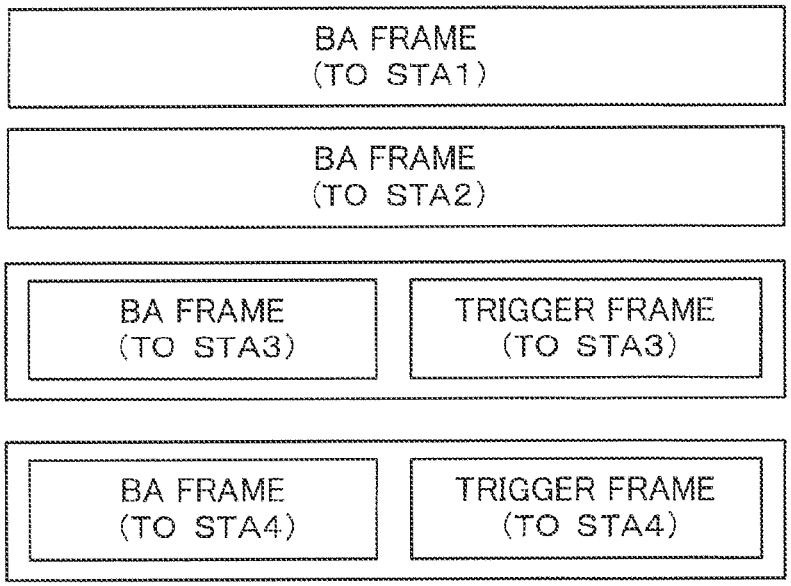
FIG. 20 is a diagram showing another example of the frame transmission according to the third embodiment.
Figure 21:
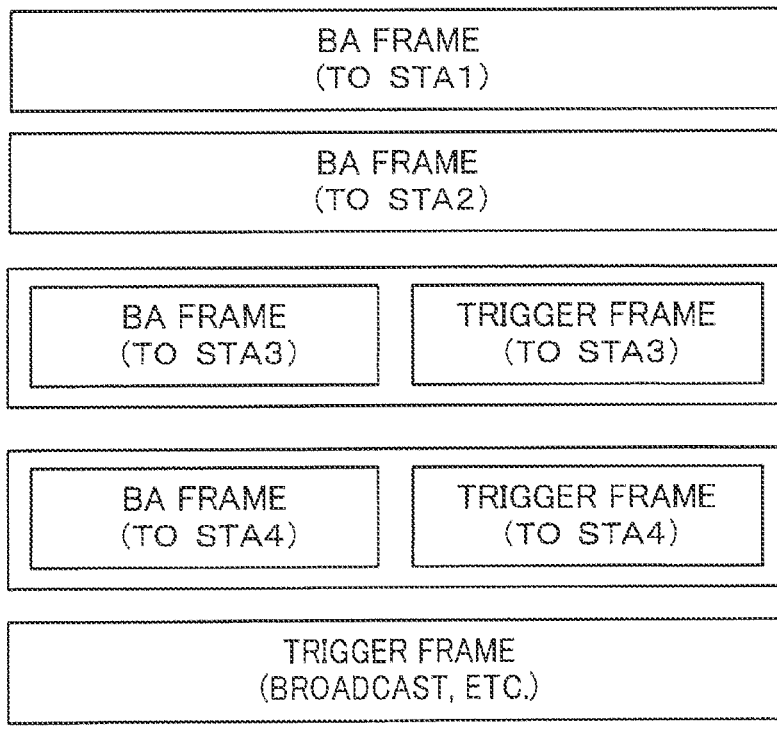
FIG. 21 is a diagram showing another example of the frame transmission according to the third embodiment.

As shown in FIG. 20, the access point may subject only the BA frame to the beam transmission to a part of the wireless terminals (wireless terminals 1 and 2 in this case) and subject the aggregation frame in which the BA frame is conjunct with the trigger frame to the beam transmission to other wireless terminals (wireless terminals 3 and 4 in this case). Furthermore, as shown in FIG. 21, the trigger frame in which is set the authorized terminal information specifying other wireless terminal than the wireless terminals 1 to 4 may be subjected to the beam transmission additionally to other wireless terminal than the wireless terminals 1 to 4. The receiver address of the trigger frame is a broadcast address or a multicast address, as an example. In a case of the beam transmission to one wireless terminal, this address may be the unicast address of the relevant wireless terminal.

Figure 22:
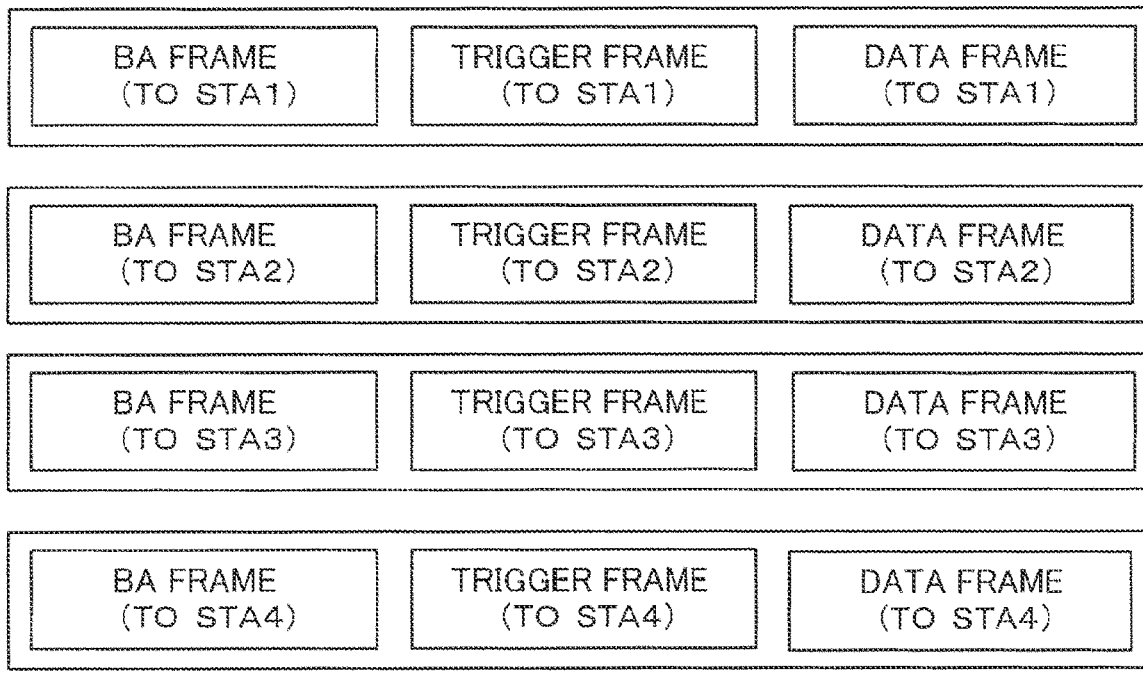
FIG. 22 is a diagram showing another example of the frame transmission according to the third embodiment.

In the example shown in FIG. 18, the aggregation frame in which the acknowledgement response frame (Multi-STA BA frame, BA frame, etc.) is conjunct with the trigger frame is transmitted, but the conjunct frames are not limited to these two kinds of frames. For example, in addition to the acknowledgement response frame and the trigger frame, the downlink data frame may be further conjunct therewith. FIG. 22 shows an example in which the aggregation frame for each wireless terminal in FIG. 18 is further conjunct with the data frame.

In the embodiment, the case of the DL-MU-MIMO transmission as the downlink user multiplexing transmission scheme is shown, but the DL-OFDMA may be used as the downlink user multiplexing transmission scheme. The UL-OFDMA is described in the first embodiment, but the DL-OFDMA is basically similar to the UL-OFDMA except that the communication direction is a downlink direction. The DL-OFDMA uses a plurality of resource units to perform simultaneous transmission from the access point to the plural wireless terminals. In a case where the plural aggregation frames in FIG. 18 is subjected to the DL-OFDMA transmission, the resource units different from each other may be allocated respectively to the wireless terminals 1 to 4 to simultaneously transmit the aggregation frames for the wireless terminals 1 to 4 by the respective resource units. In the case of FIG. 19, the resource units respectively allocated to the wireless terminals 1 and 2 may be used to transmit the aggregation frames at the uppermost and middle in FIG. 19, and the aggregation frame at the lowermost in FIG. 19 may be transmitted to the wireless terminals 3 and 4 by use of a common resource unit different from the resource units for the wireless terminals 1 and 2.

The resource units used for the downlink transmission to the wireless terminals are not necessarily notified in advance to the wireless terminals, and the physical headers of the plural frames subjected to the downlink transmission to these wireless terminals may be set to information on the resource units to be decoded by the respective terminals. In this case, at least a part of a head side of the physical header (here, referred to as SIG field) is transmitted at a frequency band of a channel width including these resource units (see FIG. 11) such that the relevant SIG field can be commonly received by the all wireless terminals. The relevant SIG field is set to the information identifying the resource unit allocated for each wireless terminal, and the wireless terminal may refer to the relevant information to grasp the resource unit to be received by itself. For example, in the relevant SIG field, the AID for the wireless terminal and the identification information of the resource unit are set to be associated with each other. In the case of the frame (aggregation frame) transmitted by way of the broadcast as the lowermost in FIG. 19, the ID specifying the plural wireless terminals or all wireless terminals may be defined such that the relevant ID and the identification information of the resource unit are set in the above SIG field to be associated with each other.

Fourth Embodiment

Figure 23:
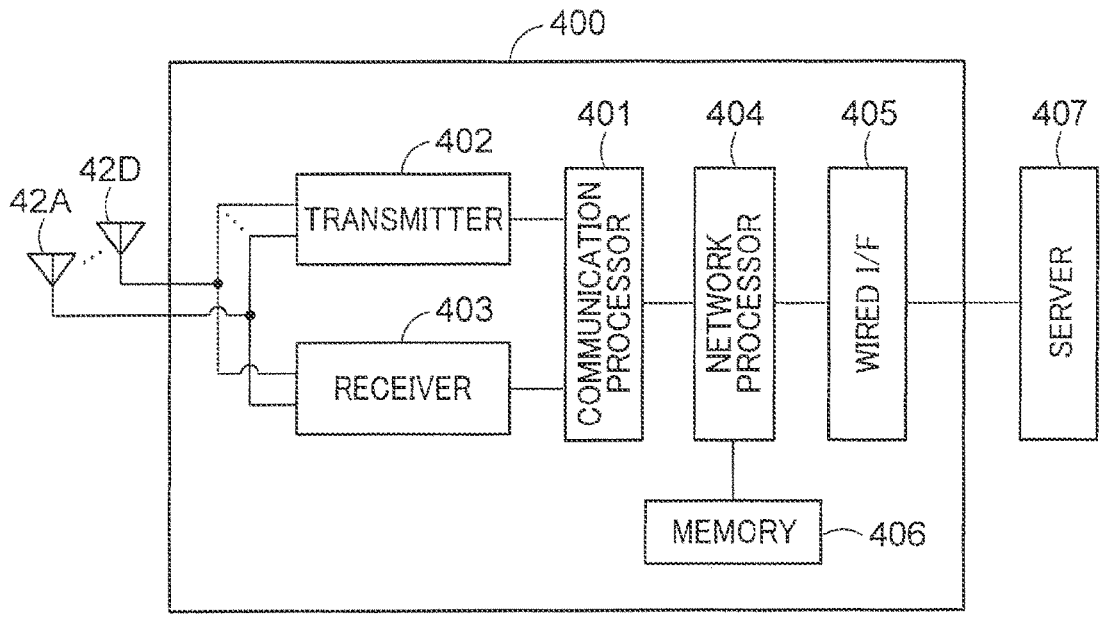
FIG. 23 is a functional block diagram of a base station or a terminal according to a fourth embodiment.

FIG. 23 is a functional block diagram of a base station (access point) 400 according to a fourth embodiment. The access point includes a communication processor 401, a transmitter 402, a receiver 403, antennas 42A, 42B, 42C, and 42D, a network processor 404, a wired I/F 405, and a memory 406. The access point 400 is connected to a server 407 through the wired I/F 405. The communication processor 401 has functions similar to the controller 101 described in the first embodiment. The transmitter 402 and the receiver 403 have functions similar to the transmitter 102 and the receiver 102 described in the first embodiment. The network processor 404 has functions similar to the higher processor described in the first embodiment. The communication processor 401 may internally possess a buffer for transferring data to and from the network processor 404. The buffer may be a volatile memory, such as a DRAM, or may be a non-volatile memory, such as a NAND and an MRAM.

The network processor 404 controls data exchange with the communication processor 401, data writing and reading to and from the memory 406, and communication with the server 407 through the wired I/F 405. The network processor 404 may execute an upper communication process of the MAC layer, such as TCP/IP and UDP/IP, or a process of the application layer. The operation of the network processor may be performed through processing of software (program) by a processor, such as a CPU. The operation may be performed by hardware or may be performed by both of the software and the hardware.

For example, the communication processor 401 corresponds to a baseband integrated circuit, and the transmitter 402 and the receiver 403 correspond to an RF integrated circuit that transmits and receives frames. The communication processor 401 and the network processor 404 may be formed by one integrated circuit (one chip). Parts that execute processing of digital domains of the transmitter 402 and the receiver 403 and parts that execute processing of analog domains may be formed by different chips. The communication processor 401 may execute an upper communication process of the MAC layer, such as TCP/IP and UDP/IP. Although the number of antennas is four here, it is only necessary that at least one antenna is included.

The memory 406 saves data received from the server 407 and data received by the receiver 402. The memory 406 may be, for example, a volatile memory, such as a DRAM, or may be a non-volatile memory, such as a NAND and an MRAM. The memory 406 may be an SSD, an HDD, an SD card, an eMMC, or the like. The memory 406 may be provided outside of the base station 400.

The wired I/F 405 transmits and receives data to and from the server 407. Although the communication with the server 407 is performed through a wire in the present embodiment, the communication with the server 407 may be performed wirelessly. In this case, a wireless I/F may be employed instead of the wired I/F 405.

The server 407 is a communication device that returns a response including requested data in response to reception of a data forward request for requesting transmission of the data. Examples of the server 407 include an HTTP server (Web server) and an FTP server. However, the server 407 is not limited to these as long as the server 407 has a function of returning the requested data. The server 407 may be a communication device operated by the user, such as a PC and a smartphone.

When the STA belonging to the BSS of the base station 400 issues a forward request of data for the server 407, a packet regarding the data forward request is transmitted to the base station 400. The base station 400 receives the packet through the antennas 42A to 42D. The base station 400 causes the receiver 403 to execute the process of the physical layer and the like and causes the communication processor 401 to execute the process of the MAC layer and the like.

The network processor 404 analyzes the packet received from the communication processor 401. Specifically, the network processor 404 checks the destination IP address, the destination port number, and the like. When the data of the packet is a data forward request such as an HTTP GET request, the network processor 404 checks whether the data requested by the data forward request (for example, data in the URL requested by the HTTP GET request) is cached (stored) in the memory 406. A table associating the URL (or reduced expression of the URL, such as a hash value and an identifier substituting the URL) and the data is stored in the memory 406. The fact that the data is cached in the memory 406 will be expressed that the cache data exists in the memory 406.

When the cache data does not exist in the memory 406, the network processor 404 transmits the data forward request to the server 407 through the wired I/F 405. In other words, the network processor 404 substitutes the STA to transmit the data forward request to the server 407. Specifically, the network processor 404 generates an HTTP request and executes protocol processing, such as adding the TCP/IP header, to transfer the packet to the wired I/F 405. The wired I/F 405 transmits the received packet to the server 407.

The wired I/F 405 receives, from the server 407, a packet that is a response to the data forward request. From the IP header of the packet received through the wired I/F 405, the network processor 404 detects that the packet is addressed to the STA and transfers the packet to the communication processor 401. The communication processor 401 executes processing of the MAC layer and the like for the packet. The transmitter 402 executes processing of the physical layer and the like and transmits the packet addressed to the STA from the antennas 42A to 42D. The network processor 404 associates the data received from the server 407 with the URL (or reduced expression of the URL) and saves the cache data in the memory 406.

When the cache data exists in the memory 406, the network processor 404 reads the data requested by the data forward request from the memory 406 and transmits the data to the communication processor 401. Specifically, the network processor 404 adds the HTTP header or the like to the data read from the memory 406 and executes protocol processing, such as adding the TCP/IP header, to transmit the packet to the communication processor 401. In this case, the transmitter IP address of the packet is set to the same IP address as the server, and the transmitter port number is also set to the same port number as the server (destination port number of the packet transmitted by the communication terminal), for example. Therefore, it can be viewed from the STA as if communication with the server 407 is established. The communication processor 401 executes processing of the MAC layer and the like for the packet. The transmitter 402 executes processing of the physical layer and the like and transmits the packet addressed to the STA from the antennas 42A to 42D.

According to the operation, frequently accessed data is responded based on the cache data saved in the memory 406, and the traffic between the server 407 and the base station 400 can be reduced. Note that the operation of the network processor 404 is not limited to the operation of the present embodiment. There is no problem in performing other operation when a general caching proxy is used, in which data is acquired from the server 407 in place of the STA, the data is cached in the memory 406, and a response is made from the cache data of the memory 406 for a data forward request of the same data.

The transmission of the frame, the data or the packet used in the first to third embodiments may be carried out based on the cached data stored in the memory 406.

The base station (access point) of the present embodiment can be applied as the base station of the first to third embodiments. In the present embodiment, although the base station with the cache function is described, a terminal (STA) with the cache function can also be realized by the same block configuration as FIG. 23. In this case, the wired I/F 405 may be omitted.

Fifth Embodiment

Figure 24:
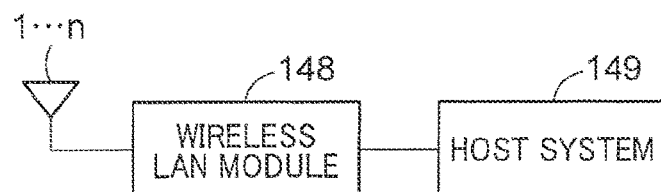
FIG. 24 is a diagram showing an exemplary entire configuration of a terminal or access point.

FIG. 24 shows an example of entire configuration of a terminal or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to the first embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external devices according to an arbitrary communication protocol. The communication protocol may include the TCP/IP and a protocol of a layer upper than that. Alternatively, the TCP/IP may be mounted on the wireless LAN module 148, and the host system 149 may execute only a protocol in a layer upper than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, and a hand-held device.

Figure 25:
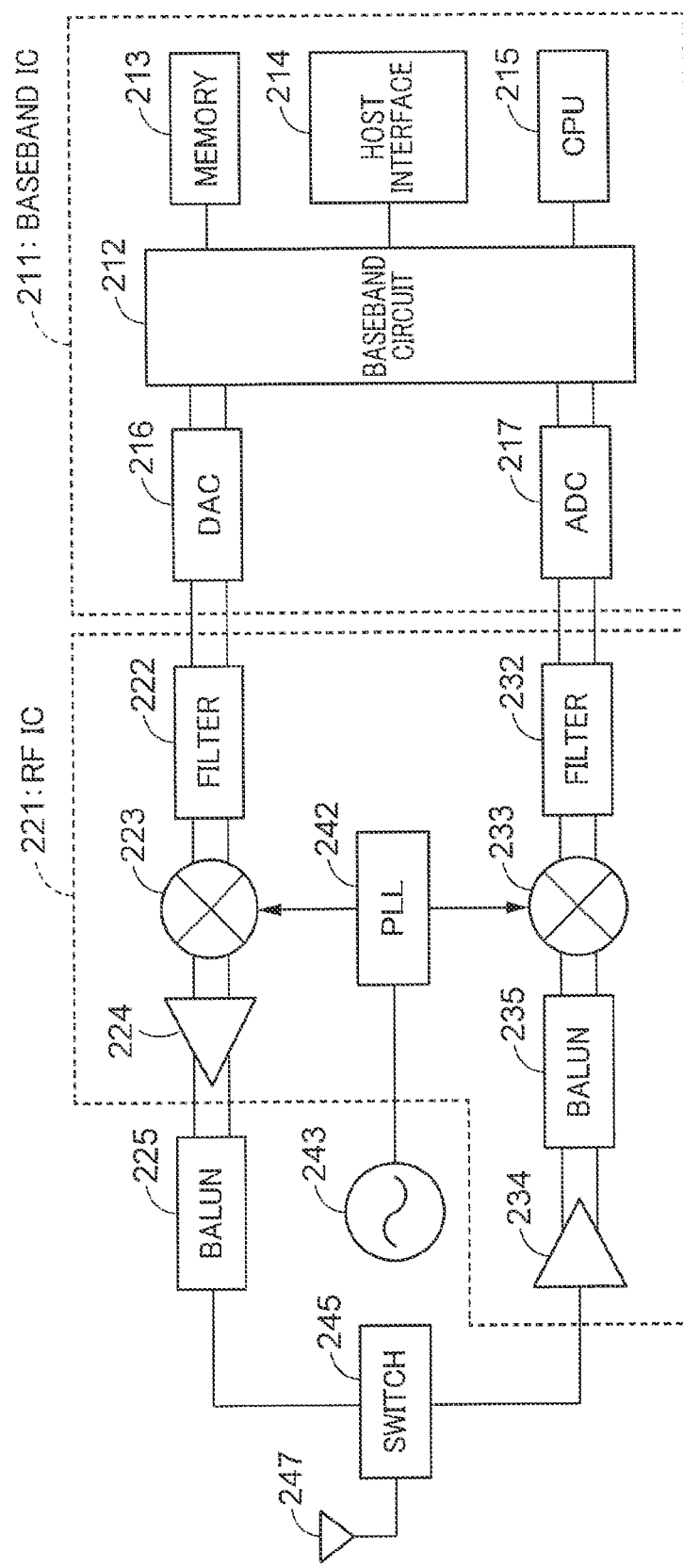
FIG. 25 is a diagram showing an exemplary hardware configuration of a wireless communication device installed at an access point or a wireless terminal according to a fourth embodiment.

FIG. 25 shows an example of hardware configuration of a wireless LAN module. The configuration can also be applied when the wireless communication device (or a wireless device) is mounted on either one of the terminal that is a non-base station and the base station. Therefore, the configuration can be applied as an example of specific configuration of the wireless communication device shown in FIG. 8 or 10. At least one antenna 247 is included in the example of configuration. When a plurality of antennas are included, a plurality of sets of a transmission system (216 and 222 to 225), a reception system (232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication device or wireless device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM and a DRAM, or may be a non-volatile memory, such as a NAND and an MRAM.

The host interface 214 is an interface for connection to the host system. The interface can be anything, such as UART, SPI, SDIO, USB, and PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control device that controls communication or the controller that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process, and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters. The RF IC 221 is connected to the antenna 247 through the switch 245.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the balun 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

The detailed description of the process of the above-described components is obvious from the description of FIGS. 7 and 8, and therefore redundant descriptions will be omitted.

Sixth Embodiment

Figure 26:
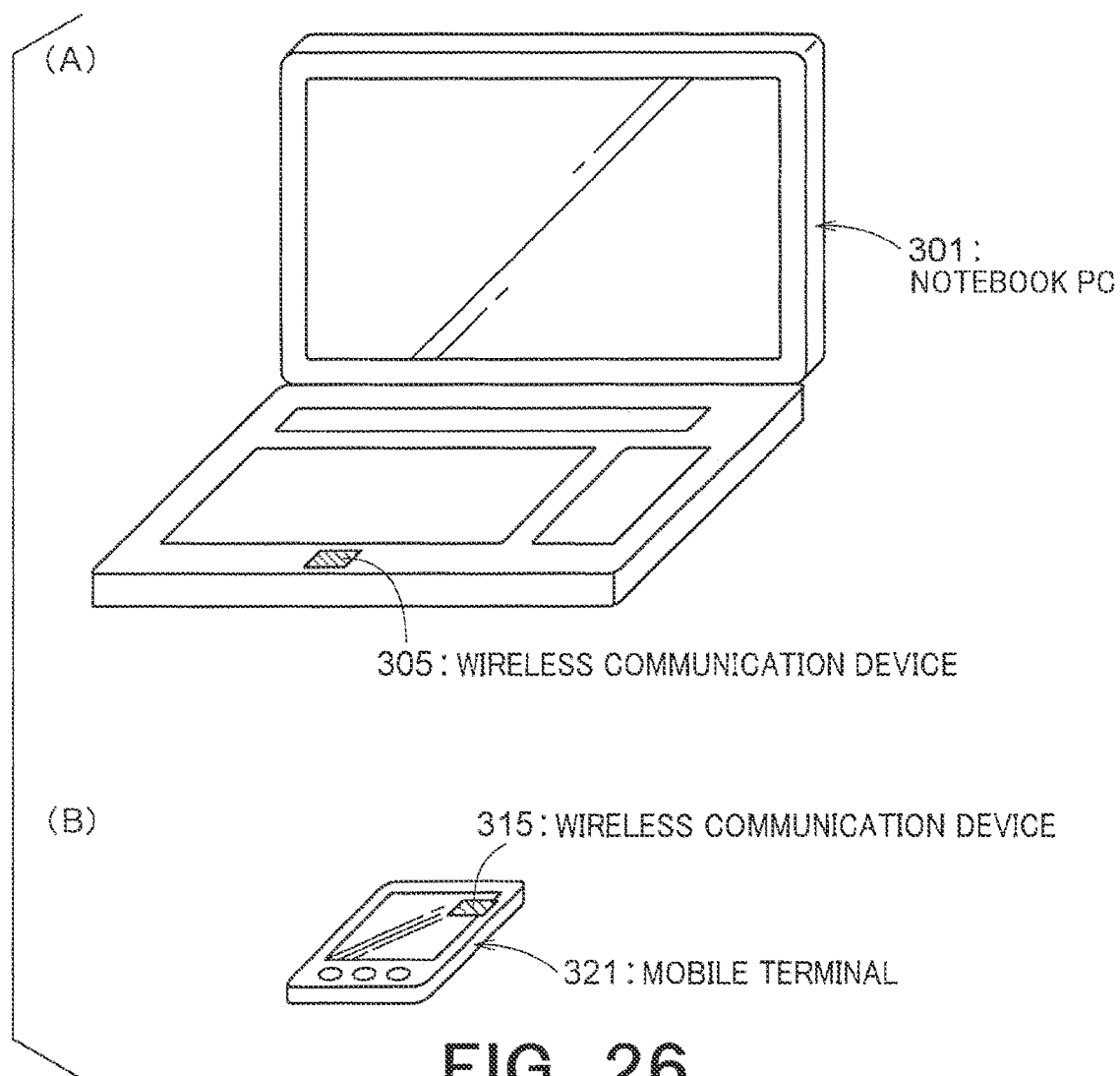
FIG. 26 shows a perspective view of a wireless terminal according to a fifth embodiment.

FIG. 26(A) and FIG. 26(B) are perspective views of wireless terminal according to the sixth embodiment. The wireless terminal in FIG. 26(A) is a notebook PC 301 and the wireless communication device (or a wireless device) in FIG. 26(B) is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device and so on.

Figure 27:
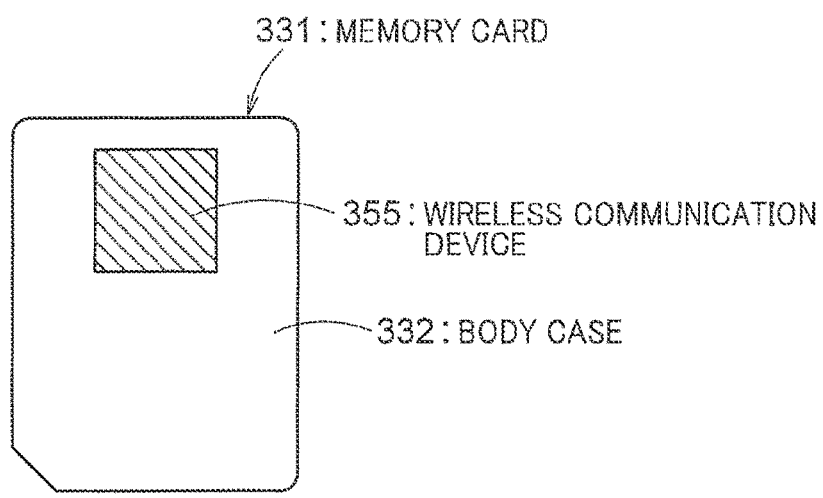
FIG. 27 is a diagram showing a memory card according to the fifth embodiment.

Moreover, a wireless communication device installed in a terminal (which may indicate a base station) can also be provided in a memory card. FIG. 27 illustrates an example of a wireless communication device mounted on a memory card. A memory card 331 contains a wireless communication device 355 and a body case 332. The memory card 331 uses the wireless communication device 355 for wireless communication with external devices. Here, in FIG. 27, the description of other installed elements (for example, a memory, and so on) in the memory card 331 is omitted.

Seventh Embodiment

In the seventh embodiment, a bus, a processor unit and an external interface unit are provided in addition to the configuration of the wireless communication device of the terminal (which may indicate the base station) according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

Eighth Embodiment

In the eighth embodiment, a clock generating unit is provided in addition to the configuration of the wireless communication device of the terminal (which may indicate the base station) according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Ninth Embodiment

In the ninth embodiment, a power source unit, a power source controlling unit and a wireless power feeding unit are included in addition to the configuration of the wireless communication device of the terminal (which may indicate the base station) according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Tenth Embodiment

In the tenth embodiment, a SIM card is added to the configuration of the wireless communication device according to any of the above embodiments. For example, the SIM card is connected with the controller, the transmitter, the receiver or plural of them in the wireless communication device. Thus, by adopting a configuration in which the SIM card is included in the wireless communication device, authentication processing can be easily performed.

Eleventh Embodiment

In the eleventh embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Twelfth Embodiment

In the twelfth embodiment, an LED unit is added to the configuration of the wireless communication device of the terminal (which may indicate the base station) according to any of the above embodiments. For example, the LED unit is connected to the controller, the transmitter, the receiver or plural of them in the wireless communication device. Thus, by adopting a configuration in which the LED unit is included in the wireless communication device, notifying the operation state of the wireless communication device to the user can be easily done.

Thirteenth Embodiment

In the thirteenth embodiment, a vibrator unit is included in addition to the configuration of the wireless communication device wireless communication device of the terminal (which may indicate the base station) according to any of the above embodiments. For example, the vibrator unit is connected to at least one of the controller, the transmitter, the receiver or plural of them in the wireless communication device. Thus, by adopting a configuration in which the vibrator unit is included in the wireless communication device, notifying the operation state of the wireless communication device to the user can be easily done.

Fourteenth Embodiment

In a fourteenth embodiment, the configuration of the wireless communication device includes a display in addition to the configuration of the wireless communication device (the wireless communication device of the terminal (which may indicate the base station) according to any one of the above embodiments. The display may be connected to the controller, the transmitter, the receiver or plural of them in the wireless communication device via a bus (not shown). As seen from the above, the configuration including the display to display the operation state of the wireless communication device on the display allows the operation status of the wireless communication device to be easily notified to a user.

Fifteenth Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In the IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection, there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. The frame for disconnection may be referred to as "release frame" by the meaning of releasing connection, for example. Normally, it is determined that the connection is disconnected at the timing of transmitting the release frame in a wireless communication device on the side to transmit the release frame and at the timing of receiving the release frame in a wireless communication device on the side to receive the release frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the release frame cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in the IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Carrier Avoidance is a suitable scheme to share a radio medium between the plurality of wireless communication devices.

[4] Frame Interval of Wireless LAN

The frame interval of the IEEE802.11 wireless LAN is described. There are several types of frame intervals used in the IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in the IEEE802.11 wireless LAN, and a strict period from a previous frame is not discussed. Therefore, the definition is followed in the explanation of the IEEE802.11 wireless LAN system. In the IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In the IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 28:
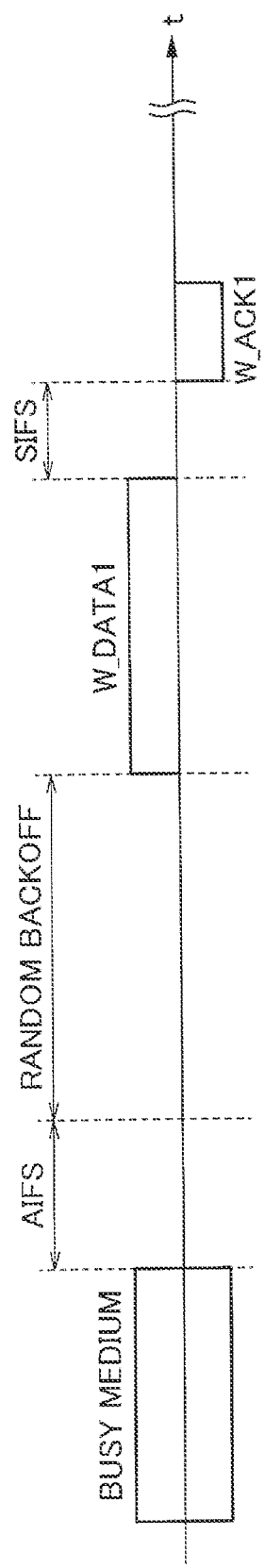
FIG. 28 is a diagram showing an example of frame exchange during a contention period.

Here, FIG. 28 illustrates one example of frame exchange in a competitive period based on the random access in the IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in the IEEE802.11 wireless LAN), the default values are defined.

For example, in the definition of 802.11ac, with an assumption that SIFS is 16 μs and the slot time is 9 μs, and thereby PIFS is 25 μs, DIFS is 34 μs, the default value of the frame interval of an access category of BACKGROUND (AC_BK) in AIFS is 79 μs, the default value of the frame interval of BEST EFFORT (AC_BE) is 43 μs, the default value of the frame interval between VIDEO(AC_VI) and VOICE(AC_VO) is 34 μs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor. The term "circuitry" may refer to not only electric circuits or a system of circuits used in a device but also a single electric circuit or a part of the single electric circuit. Moreover, the term "circuitry" may refer one or more electric circuits disposed on a single chip, or may refer one or more electric circuits disposed on a plurality of chips or a plurality of devices in a dispersed manner.

In the specification, the expression "at least one of a, b or c" is an expression to encompass not only "a", "b", "c", "a and b", "a and c", "b and c", "a, b and c" or any combination thereof but also a combination of at least a plurality of same elements such as "a and a", "a, b and b" or "a, a, b, b, c and c". Also, the expression is an expression to allow a set including an element other than "a", "b" and "c" such as "a, b, c, and d".

Note that the frames described in the embodiments may indicate not only things called frames in, for example, the IEEE 802.11 standard, but also things called packets, such as Null Data Packets. When it is expressed that the base station transmits or receives a plurality of frames or a plurality of X-th frames, the frames or the X-th frames may be the same (for example, the same type or the same content) or may be different. An arbitrary value can be put into X according to the situation. The plurality of frames or the plurality of X-th frames may be transmitted or received at the same time or may be transmitted or received at temporally different timings. When it is expressed that a first frame, a second frame, and the like are transmitted or received at temporally different points, the expression of the first, the second, and the like is just an expression for distinguishing the frames, and the types and the content of the frames may be the same or different.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A wireless communication device comprising:
   a receiver configured to receive a first trigger frame including first information specifying at least one wireless communication device for triggering uplink multiplexing transmission from an access point;
   a transmitter configured to transmit a first frame in the uplink multiplexing transmission to the access point in response to the wireless communication device being specified in the first information, the first frame being multiplexed with another first frame transmitted from another wireless communication device specified in the first information;
   wherein
   the receiver is configured to receive a second frame including a third frame and a second trigger frame from the access point,
   the third frame contains check results indicating whether the first frame and the another first frame are successfully received in the receiver,
   the second trigger frame includes second information specifying at least one wireless communication device for triggering uplink multiplexing transmission,
   the receiver is configured to determine whether the first frame is required to be retransmitted based on the check result corresponding to the first frame,
   the transmitter is configured to transmit a fourth frame in the uplink multiplexing transmission to the access point in response to the wireless communication device being specified in the second information, the fourth frame being multiplexed with another fourth frame transmitted from another wireless communication device specified in the second information, and
   the fourth frame includes at least one of the first frame or a fifth frame depending on a determination result of whether the first frame is required to be retransmitted.

2. The wireless communication device according to claim 1, wherein the transmitter is configured to transmitter the first frame in SIFS after the first trigger frame is received.

3. The wireless communication device according to claim 2, wherein the receiver is configured to receive the second frame in SIFS after the first frame is transmitted.

4. The wireless communication device according to claim 3, wherein the transmitter is configured to transmit the fourth frame in SIFS after the second frame is received.

5. The wireless communication device according to claim 1, wherein the second frame is an aggregated frame of the third frame and the second trigger frame.

6. The wireless communication device according to claim 1, wherein the fourth frame is an aggregated frame of the first frame and the fifth frame.

7. The wireless communication device according to claim 1, wherein the transmitter is configured to transmit a plurality of the first frames,
   the receive is configured to determine that the frames are required to be retransmitted based on the check results corresponding to the first frames, and
   the fourth frame is an aggregated frame of the first frames.

8. The wireless communication device according to claim 1, wherein the fourth frame is an aggregated frame of a plurality of the fifth frames.

9. The wireless communication device according to claim 1, wherein the third frame contains bitmap of the check results.

10. The wireless communication device according to claim 9, wherein the receiver is configured to detect a bit corresponding to the first frame in the bit map and determine whether the first frame is required to be retransmitted based on a value of the bit.

11. The wireless communication device according to claim 1, further comprising at least one antenna.

12. A wireless communication method comprising:
   receiving a first trigger frame including first information specifying at least one wireless communication device for triggering uplink multiplexing transmission from an access point;
   transmitting a first frame in the uplink multiplexing transmission to the access point in response to the wireless communication device being specified in the first information, the first frame being multiplexed with another first frame transmitted from another wireless communication device specified in the first information;
   receiving a second frame including a third frame and a second trigger frame from the access point wherein the third frame contains check results indicating whether the first frame and the another first frame are successfully received in the receiver, and the second trigger frame includes second information specifying at least one wireless communication device for triggering uplink multiplexing transmission;
   determining whether the first frame is required to be retransmitted based on the check result corresponding to the first frame;

transmitting a fourth frame in the uplink multiplexing transmission to the access point in response to the wireless communication device being specified in the second information, the fourth frame being multiplexed with another fourth frame transmitted from another wireless communication device specified in the second information, wherein the fourth frame includes at least one of the first frame or a fifth frame depending on a determination result of whether the first frame is required to be retransmitted.

\* \* \* \* \*